(12) United States Patent
Loeebbert et al.

(10) Patent No.: US 7,849,150 B2
(45) Date of Patent: Dec. 7, 2010

(54) ELECTRONIC DEVICE HAVING COMMUNICATION FUNCTION

(75) Inventors: Johannes Loeebbert, Stuttgart (DE); Takashi Sasai, Kanagawa (JP)

(73) Assignees: Sony Corporation, Tokyo (JP); Sony Deutschland GmbH, Cologne (DE)

( * ) Notice: Subject to any disclaimer, the term of this patent is extended or adjusted under 35 U.S.C. 154(b) by 948 days.

(21) Appl. No.: 10/497,098

(22) PCT Filed: Sep. 25, 2003

(86) PCT No.: PCT/JP03/12276
§ 371 (c)(1),
(2), (4) Date: May 28, 2004

(87) PCT Pub. No.: WO2004/032424
PCT Pub. Date: Apr. 15, 2004

(65) Prior Publication Data
US 2005/0086273 A1    Apr. 21, 2005

(30) Foreign Application Priority Data
Oct. 4, 2002    (JP) .............................. 2002-292333

(51) Int. Cl.
*G06F 15/16*  (2006.01)
*G06F 15/177*  (2006.01)
(52) U.S. Cl. .................. 709/208; 709/209; 709/221
(58) Field of Classification Search .............. 709/208, 709/209
See application file for complete search history.

(56) References Cited
U.S. PATENT DOCUMENTS 6,366,622 B1 * 4/2002 Brown et al. ................ 375/322
6,879,570 B1 * 4/2005 Choi .......................... 370/329
7,110,784 B2 * 9/2006 Nasu et al. .................. 455/517
2002/0022495 A1 * 2/2002 Choi et al. .................. 455/522
2002/0032025 A1   3/2002 Maeshima et al.
2002/0044549 A1 * 4/2002 Johansson et al. .......... 370/386

(Continued)

FOREIGN PATENT DOCUMENTS
JP    10-145276    5/1998

(Continued)

OTHER PUBLICATIONS

Tai Yun Kim, A Leader Election Algorithm in a Distributed Computing System, 1995, IEEE, p. 481-485.*

(Continued)

*Primary Examiner*—Karen C Tang
(74) *Attorney, Agent, or Firm*—Oblon, Spivak, McClelland, Maier & Neustadt, L.L.P.

(57) ABSTRACT

This invention concerns a network comprising a master and slaves. In the network, each slave figures out its performance values as performance parameters and transmits the performance parameters to the master. The master performs a process of selecting a backup master as a candidate for the next master, on the basis of the performance parameters transmitted from the slaves. The master supplies BM information containing synchronization information and the address of the backup master selected, to the slaves. When the master is removed from the network, the slaves determine the next master in accordance with the backup-master information. Thus, the slaves can be immediately connected to the next master.

19 Claims, 20 Drawing Sheets

U.S. PATENT DOCUMENTS

| | | | |
|---|---|---|---|
| 2002/0075940 A1* | 6/2002 | Haartsen | 375/132 |
| 2003/0013472 A1* | 1/2003 | Miklos et al. | 455/517 |
| 2004/0148404 A1* | 7/2004 | Muroya et al. | 709/228 |
| 2004/0204046 A1* | 10/2004 | Bonta et al. | 455/556.1 |
| 2004/0221046 A1* | 11/2004 | Heinonen et al. | 709/227 |
| 2005/0063313 A1* | 3/2005 | Nanavati et al. | 370/252 |
| 2005/0079817 A1* | 4/2005 | Kotola et al. | 455/41.2 |
| 2005/0096080 A1* | 5/2005 | Choi et al. | 455/522 |

FOREIGN PATENT DOCUMENTS

| | | |
|---|---|---|
| JP | 2001-186213 | 7/2001 |
| JP | 2002-101166 | 4/2002 |
| JP | 2002-223217 | 8/2002 |
| JP | 2002-271342 | 9/2002 |
| WO | WO 0239484 A2 * | 5/2002 |

OTHER PUBLICATIONS

Korean Office Action dated July 1, 2010.

* cited by examiner

| PARAMETER IDENTIFIER (PARAM) | TYPE OF PARAMETER | VALUE OF PERFORMANCE PARAMETER (INDEX) |
|---|---|---|
| (1) 0×01 | REMAINING BATTERY POWER | 0×00~0×FF |
| (2) 0×02 | CPU PERFORMANCE | 0×00~0×FF |
| (3) 0×03 | MEMORY SOURCE | 0×00~0×FF |
| (4) 0×04 | RSSI | 0×00~0×FF |
| (5) 0×05 | MASTER APTITUDE | 0×00~0×FF |

Extention Type
= [BNEP Extention Control]

FIG.9B

Extention Payload
= [NET PARAM] [PARAMNUM] [PARAM]
 [INDEX] [PARAM] [INDEX]...
= [NET PARAM] [0×05] [0×01] [0×2C] [0×02] [0×C3]
 [0×03] [0×38] [0×04] [0×8A] [0×05] [0×01]

| BM CANDIDATE | DEVICE | ADDRESS (BD Address) | CONNECTION INFORMATION (Page Scan Mode, Clock Offset) |
|---|---|---|---|
| 1 | DEVICE B | : | : |
| 2~n−1 | : | : | : |
| N | DEVICE C | : | : |

FIG.10

BNEP Type
= [BNEP Control]

FIG.14A

BNEP Payload
= [NET NET TRIGGER] [BD ADDR] [PageScanMode] [ClockOffset] [Teger UUID] [Delay before reconnect]

FIG.14B

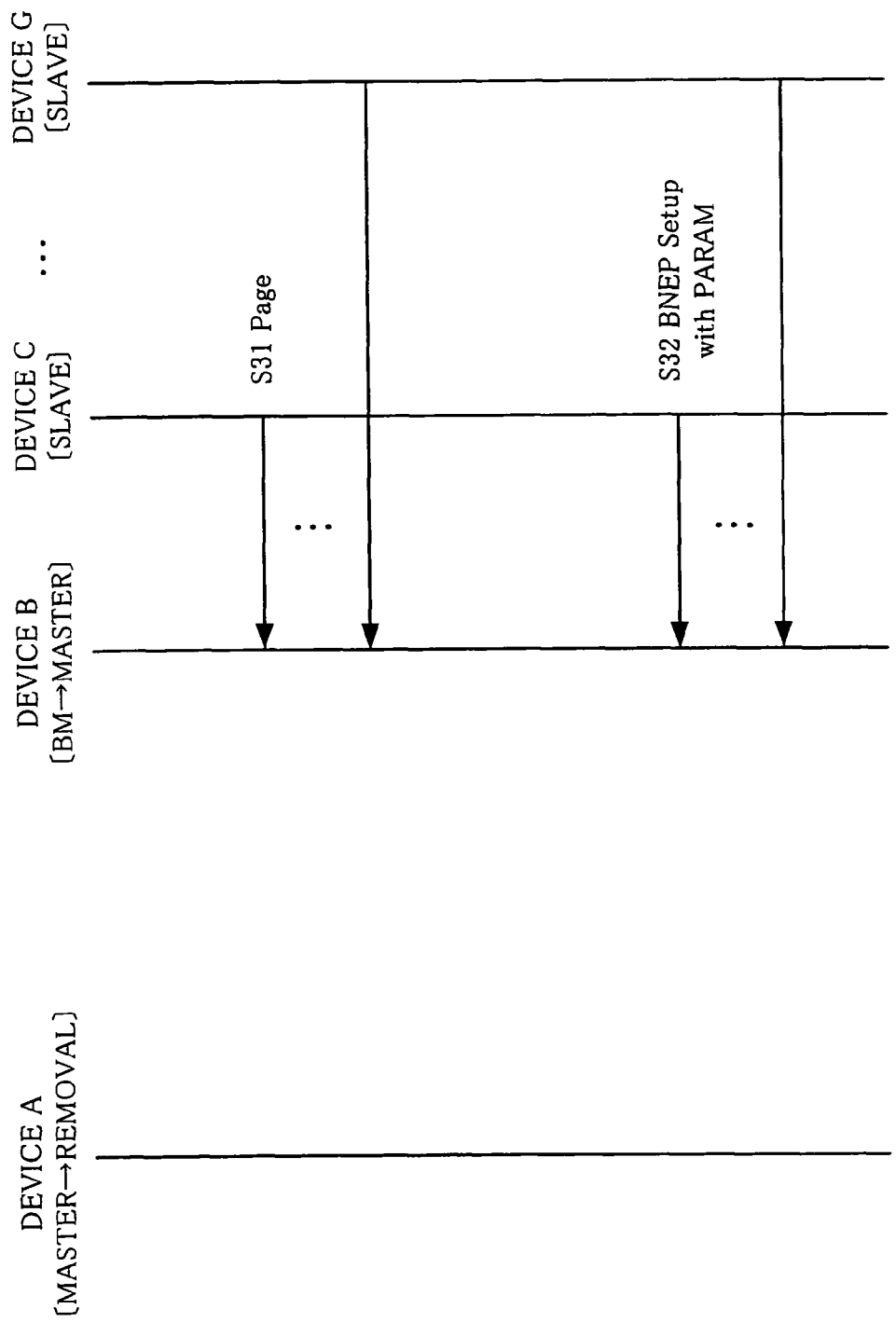

FIG.18A

BNEP Type
= [BNEP Control]

FIG.18B

BNEP Payload
= [NET BM LIST] [LIST NUM] [BD ADDR] [PageScanMode]
[ClockOffset] [Connect BackTime]
[BD ADDR] [PageScanMode] [ClockOffset] [Connect BackoffTime]
[BD ADDR] [PageScanMode] [ClockOffset] [Connect BackoffTime]

FIG.20A

BNEP Type
= [BNEP Control]

FIG.20B

BNEP Payload
= [NET SLAVES LIST] [LIST NUM] [BD ADDR]
[PageScanMode] [ClockOffset] [Connect BackTime]
[BD ADDR] [PageScanMode] [ClockOffset] [Connect BackoffTime]
[BD ADDR] [PageScanMode] [ClockOffset] [Connect BackoffTime]

ELECTRONIC DEVICE HAVING COMMUNICATION FUNCTION

TECHNICAL FIELD

The present invention relates to a communication processing apparatus, a communication processing system and a communication processing method, and also to a computer program. More particularly, the invention relates to a communication processing apparatus, a communication processing system, a communication processing method and a computer program which can easily and quickly switch a master device that functions as a communication routing device or a control device for use in wireless communication represented by, for example, Bluetooth®.

This application is based upon and claims the benefit of priority from Japanese Patent Application No. 2002-292333, filed Oct. 4, 2002, the entire contents of which are incorporated herein by reference.

BACKGROUND ART

Bluetooth has been attracting attention as means for achieving short-distance wireless communication. Various devices compliant with Bluetooth have been developed and on the market.

Systems for wireless communication by means of Bluetooth have no directivity and high transmissivity. They are therefore advantages over the conventional infrared communication system such as IrDA (Infrared Data Association). To use high-directivity communication by means of, for example, IrDA, the devices between which to accomplished communication should be appropriately positioned to face each other. Such positioning is unnecessary in any communication system that employs Bluetooth.

Bluetooth SIG Inc. controls the standards of Bluetooth. The details of the standards are available to any person. In any communication utilizing Bluetooth, a device called "master" that controls the communication transmits, by broadcasting, a device detection message for detecting the devices that exist around the master.

The master can detect any device (slave) that exists around it and has received the device-detecting message, when it receives a response message transmitted from the device that can communicate with it.

To establish communication with the device thus detected, the master identifies the device on the basis of the ID information that is contained in the response message. The communication with this device is thereby established.

In Bluetooth, each device is assigned with ID information called "Bluetooth-device address," which is used to identify the device. Since the ID information is unique to the device, it is utilized in various processes such as the management of the device.

In Bluetooth, a network composed of a master and slaves is called "piconets." In the piconet, up to seven slaves can belong to one master. All devices of the piconet are synchronized in terms of frequency axis (frequency hopping pattern) and time axis (time slot).

A plurality of piconets may be connected to one another, thus constituting a larger network, which is called "scatter net."

In Bluetooth, specification which is called "profile" is defined for each service item, in connection with the data to be transmitted and received by wireless communication and the procedure of wireless communication. The service that each device can provide is described according to the profile.

PAN (Personal Area Network) profile describes the method of communication between the slaves of a piconet. Any device of the piconet configured on the basis of the PAN profile can transmit and receive various data items in the piconet, which is one network. It is planned that, in a scatter net, too, any device can transmit and receive various data items because the scatter net is also a network. This network can be a network based on IP (Internet Protocol).

In the process of constructing such a network, it is necessary to determine which device should be the master, which device should be a slave, and which service should be used to achieve communication. It is the master that determines these, by acquiring the information about the devices existing around it, from the above-mentioned response message or the like, and in accordance with the instructions of the user.

When the master is removed from the piconet, the slaves can no longer communicate with one another through the master in the piconet. The communication must be stopped, and it is necessary to set one of the slaves as master, thereby constructing a new piconet.

At present, one of the devices is not automatically set as master. It needs to be set as such manually by the user. Hence, the user is bothered to set a new master when the piconet ceases to exist due to the removal of the master from the network, the power running-out of the master battery, or the like. Unless the user set a slave as new master, no communication can be accomplished between the other slaves in the network. The communication may be interrupted for a long time.

DISCLOSURE OF INVENTION

An object of the present invention is to provide a novel communication processing apparatus, communication processing system and communication processing method that can solve the problems of the prior art described above, and also to provide a computer program.

Another object of the invention is to provide a communication processing apparatus, a communication processing system and a communication processing method, in which a new master can be set immediately after the master is removed from a piconet, thereby reducing to a minimum the interruption of communication between the devices that constitute the piconet, and also to provide a computer program.

Still another object of the present invention is to provide a communication processing apparatus, a communication processing system and a communication processing method, and also to provide a computer program. In the apparatus, system and method, the master evaluates a slave for its aptitude for use as master, on the basis of the performance parameter supplied from the slave, selects the slave having the highest possibility, as next master, i.e., backup master, and transmits the information of the backup master to every slave. Thus, when the master is removed from the piconet, the slaves can be connected to the backup master immediately, thereby resuming the communication in the piconet.

To attain the objects described above, a communication processing apparatus according to the present invention acts as a master in a wireless communication network that comprises at least one slave which communicates through the master. The apparatus is characterized by having: a data-receiving means for receiving data from each of the slaves that are devices constituting the wireless communication network, wherein capabilities of data processing for each item of evaluation are set as performance parameters in the data; a data-processing means for performing a process of figuring out aptitude for a master based on the performance parameters received from the slave and a process of determining one slave as a backup master that is a candidate for next master based on the aptitude; and a data-transmitting means for transmitting backup-master information containing address information and synchronization information, to each slave of the wireless communication network, the address information corresponding to the backup master determined by the data-processing means.

In the communication processing apparatus according to this invention, the performance parameters include at least one of data items of remaining battery power, CPU performance, memory resource and RSSI, i.e., electric-field intensity, all pertaining to the slave, and the data-processing means is configured to figure out the mater aptitude based on at least one of the performance parameters.

In the communication processing apparatus according to the invention, the performance parameters may include at least one of data items of remaining battery power, CPU performance, memory resource and RSSI, i.e., electric-field intensity, all pertaining to the slave, and the data-processing means may be configured to figure out the mater aptitude by performing an operation in which a weight coefficient is applied to at least one of the performance parameters.

In the communication processing apparatus according to the invention, the performance parameters may include a data item representing whether the slave can be a master, and the data-processing means may be configured to figure out the master aptitude only for the slave whose data item represents to be a master.

In the communication processing apparatus according to this invention, the wireless communication network is a wireless communication network that performs Bluetooth communication, and the data-receiving means may be configured to perform a process of receiving packets, each being a BNEP packet generated in accordance with Bluetooth network encapsulation protocol (BNEP) and containing the performance parameters.

In communication processing apparatus according to the present invention, the wireless communication network is a wireless communication network that performs Bluetooth communication, and the data-transmitting means is configured to perform a process of transmitting packets, each being a BNEP packet generated in accordance with Bluetooth network encapsulation protocol (BNEP) and containing the backup-master information.

In the communication processing apparatus according to this invention, the performance parameters are stored in a BNEP packet generated in accordance with Bluetooth network encapsulation protocol (BNEP), and the data-processing means may be configured to perform a process of acquiring the performance parameters from the BNEP packets.

In the communication processing apparatus according to the invention, the data-processing means may be configured to perform a process of storing the backup-master information in a BNEP packet generated in accordance with Bluetooth network encapsulation protocol (BNEP). The backup-master information includes address information corresponding to the backup master and synchronization information.

In the communication processing apparatus according to the invention, the data-processing means further generates a backup-master activation request packet that requests for activation of the backup master, and the data-transmitting means may be configured to perform a process of transmitting the backup-master activation request packet to the backup master.

In the communication processing apparatus according to this invention, the data-processing means may be configured to perform a process of storing type information (Target UUID) in the backup-master activation request packet, the type information showing whether the master should be set as a NAP (Network Access Point) or a GN (Group Ad-hoc Network).

In the communication processing apparatus according to the invention, the data-processing means may figure out master aptitudes for the slaves, based on the performance parameters received from the slaves, and generates a packet containing a list that contains the address information items of the slaves and synchronization information, the list showing the address information items in the order of the master aptitudes of the respective slaves, and the data-transmitting means is configured to perform a process of transmitting the packet containing the list, to the slaves constituting the wireless communication network.

In the communication processing apparatus according to the present invention, the data-processing means further generates a packet to be transmitted to the backup master, the packet containing a list that contains address information of the slaves that are devices constituting the wireless communication network and synchronization information, and the data-transmitting means may be configured to perform a process of transmitting the packet containing the list, to the backup master.

Another communication processing apparatus according to this invention acts as a slave in a wireless communication network that comprises a master which controls apparatus is characterized by having: a data-processing means for generating a packet containing data set as performance parameters that are the performance values obtained of each slave; a data-transmitting means for transmitting the packet generated by the data-processing means, to the master; a data-receiving means for receiving backup-master information from the master, the backup-master information including address information corresponding to a backup master and synchronization information; a memory means for storing the backup-master information received by the data-receiving means; and a connection control means for performing a process of connecting the slaves to the backup master in accordance with the backup-master information stored in the memory means.

In this communication processing apparatus, the data-processing means is configured to generate a packet that contains data containing performance parameters of each slave. The performance parameters include at least one of data items of remaining battery power, CPU performance, memory resource and RSSI, i.e., electric-field intensity.

In the communication processing apparatus according to the invention, the data-processing means is configured to set values for the performance parameters that are data-processing performance items evaluated of each slave, in accordance with reference values set in common in the wireless communication network.

In the communication processing apparatus according to this invention, the data-processing means may be configured to generate a packet storing data in which performance parameters are set. The performance parameters include a data item representing whether the slave can be set as master.

In the communication processing apparatus according to the present invention, the wireless communication network is a wireless communication network that performs Bluetooth communication, and the data-receiving means may be configured to perform a process of generating packets, each being a BNEP packet generated in accordance with Bluetooth network encapsulation protocol (BNEP) and containing the performance parameters.

In the communication processing apparatus according to the invention, the data-processing means may be configured to perform a process of storing the performance parameters in a BNEP packet generated in accordance with Bluetooth network encapsulation protocol (BNEP).

In the communication processing apparatus according to this invention, the backup-master information is information containing a list that contains address information of a plurality of devices and synchronization information, the devices being candidates for backup master, and the connection control means may perform a process of connecting the slaves to the backup master, in the order described in the list.

A communication processing system according to the present invention functions in a wireless communication network that comprises a master which controls communication and at least one slave which communicates through the master. The system is characterized by comprising: a master which sets a backup master as a candidate for next master, on the basis of data containing performance parameters that are data-processing performance items evaluated of each slave, and which supplies backup-master information about the backup master to each slave; and slaves which perform a process of figuring out data-processing performance items evaluated of each slave in the form of performance parameters and transmitting to the master, and which performs a process of receiving the backup-master information from the master and storing the backup-master information in a memory means. Each of the slaves is configured to determine the next master on the basis of the backup-master information after disconnected from the master, and to perform a connection process thereafter.

In the communication processing system according to this invention, the performance parameters include at least one of data items of remaining battery power, CPU performance, memory resource and RSSI, i.e., electric-field intensity, all pertaining to the slave, and the master is configured to figure out a mater aptitude based on at least one of the performance parameters transmitted from each slave.

In the communication processing system according to the invention, the performance parameters include at least one of data items of remaining battery power, CPU performance, memory resource and RSSI, i.e., electric-field intensity, all pertaining to the slave, and the master may be configured to figure out the mater aptitude by performing an operation in which a weight coefficient is applied to at least one of the performance parameters.

In the communication processing system according to the present invention, the master is configured to perform a process of storing the backup-master information in a BNEP packet generated in accordance with Bluetooth network encapsulation protocol (BNEP) and transmitting the BNEP packet to the slaves. The backup-master information includes address information corresponding to the backup master and synchronization information.

In the communication processing system according to the invention, the master may be configured to perform a process of transmitting a backup-master activation request packet to the backup master. The backup-master activation request packet requests for activation of the backup master.

In the communication processing system according to the present invention, the master may be configured to perform a process of figuring out aptitude for a master based on the performance parameters received from the slave, generating a packet containing a list and transmitting the packet to the slaves. The list contains synchronization information and showing device-address information items in the order set in accordance with the master aptitudes.

In the communication processing system according to the invention, the master may be configured to perform a process of generating a packet containing a list and transmitting the packet to the backup master. The list contains synchronization information and address information items of the slaves that are devices constituting the wireless communication network.

A master-controlling method according to the present invention is designed for use in a communication processing apparatus which is to act as a master in a wireless communication network that comprises at least one slave which communicates through the master. The method is characterized by having: a data-receiving step of receiving data from each of the slaves that are devices constituting the wireless communication network, wherein capabilities of data processing for each item of evaluation are set as performance parameters in the data; a data-processing step of performing a process of figuring out aptitude for a master based on the performance parameters received from the slave and a process of determining one slave as a backup master that is a candidate for next master based on the master aptitude; and a data-transmitting step of transmitting backup-master information containing address information and synchronization information, to each slave of the wireless communication network, the address information corresponding to the backup master determined by the data-processing means.

In the master-controlling method according to the invention, the performance parameters include at least one of data items of remaining battery power, CPU performance, memory resource and RSSI, i.e., electric-field intensity, all pertaining to the slave, and the data-processing step is to figure out the mater aptitude based on at least one of the performance parameters.

A master-connection method according to the present invention is designed for use in a communication processing apparatus which is to act as a slave in a wireless least one slave which communicates through the master. The method is characterized by having: a data-processing step of generating a packet containing data set as performance parameters that are the performance values obtained of each slave; a data-transmitting step of transmitting the packet generated in the data-processing step, to the master; a data-receiving step of receiving backup-master information from the master, the backup-master information including address information corresponding to a backup master and synchronization information; a storing step of storing the backup-master information received in the data-receiving step; and a connection-controlling step of performing a process of connecting the slaves to the backup master in accordance with the backup-master information stored in the storing step.

In the master-connection method according to this invention, the data-processing step is to generate a packet that contains data containing performance parameters of each slave. The performance parameters include at least one of data items of remaining battery power, CPU performance, memory resource and RSSI, i.e., electric-field intensity, all pertaining to the slave.

A computer program according to the present invention is designed to control a communication processing apparatus which is to act as a master in a wireless communication network that comprises at least one slave which communicates through the master. The computer program is characterized by describing: a data-receiving step of receiving data from each of the slaves that are devices constituting the wireless communication network, wherein capabilities of data processing for each item of evaluation are set as performance parameters in the data; a data-processing step of performing a process of figuring out aptitude for a master based on the performance parameters received from the slave and a process of determining one slave as a backup master that is a candidate for next master based on the master aptitude; and a data-transmitting step of transmitting backup-master information containing address information and synchronization information, to each slave of the wireless communication network. The address information corresponds to the backup master determined in the data-processing step.

Another computer program according to this invention is designed to perform a process of connecting a communication processing apparatus which is to act as a slave in a wireless communication network that comprises a master which controls communication and at least one slave which communicates through the master. This program is characterized by describing: a data-processing step of generating a packet containing data set as performance parameters that are the performance values obtained of each slave; a data-transmitting step of transmitting the packet generated in the data-processing step, to the master; a data-receiving step of receiving backup-master information from the master, the backup-master information including address information corresponding to a backup master and synchronization information; a storing step of storing the backup-master information received in the data-receiving step; and a connection-controlling step of performing a process of connecting the slaves to the backup master in accordance with the backup-master information stored in the storing step.

The present invention concerns a wireless communication network comprising a master that performs a communication control process and at least one slave that performs communication via the master. In the network, each slave figures out performance parameters that are its performance values and transmits the performance parameters to the master. The master selects a backup master as a candidate for the next master, on the basis of the performance parameters transmitted from the slave. The master then performs a process of supplying backup-master information containing synchronization information and the address of the backup master selected. Hence, each slave can determine the next master from the backup-master information, even if the master is removed from the network. Thus, the slave can be immediately connected to the next master, and the user need not select a backup master. This shortens the interruption of communication between the slaves and make it possible to connect the slaves to the new master efficiently.

In the present invention, the performance parameters are the data-processing performance items evaluated of each slave, such as the remaining battery power, CPU performance, memory resource and RSSI (electric-field intensity). On the basis of these information items the master can select a slave as backup master, which can cope with the operating condition of the network.

According to the invention, the backup-master information the master sends to the slaves contains the synchronization information about the backup master. Therefore, at least a part of the process of establishing synchronization necessary for the reconstruction of the network need not be carried out. This makes it possible to reconstruct the network efficiently within a short time.

In the present invention, backup-master information that is a list showing devices in the descending order of their master aptitudes may be transmitted to the slaves. Then, the slaves can have information about a plurality of backup masters. Namely, each slave can acquire the information of the other devices that constitute the piconet. Thus, if any slave cannot be connected to the backup master having the highest master aptitude when the master is removed from the piconet, because the backup master has been already removed from the piconet, it may be connected to the backup mater that has the second highest master aptitude.

According to the invention, a slave list may be transmitted the backup master. Then, in accordance with the slave list, the device selected as new master can be connected to the slaves, one after another, after the master is disconnected from the slaves. Each slave need not perform any process to connect it to the master. The device selected as new master can use the Bluetooth-device addresses (BD ADDRs) contained in the slave list and also the synchronization information, all transmitted from the previous master. The new master can therefore efficiently establish connection with the slaves. In the piconet thus set anew, the slaves can communicate with one another through the new master.

The computer program according to the invention can be provided as data that can be read by general-purpose computer systems that can execute various programs. The program can be provided in the form of a computer-readable recording medium such as a CD (compact disk), an FD (floppy disk) or an MO (magneto optical disk) or via a communication medium such as a network. Once a computer system has read this program, it can carry out processes described in the program.

The system implementing this invention is a logical assembly of various components. All components of the system are not necessarily arranged within the same housing.

The other objects of the invention and the advantages achieved by the invention will be more apparent from the embodiments that will be described below with reference to the accompanying drawings.

BRIEF DESCRIPTION OF DRAWINGS

FIG. 8 is a diagram showing examples of performance parameters that the slaves may transmit to the master;

FIG. 9A is a diagram depicting an expansion type for the expansion header set in a packet to be transmitted, the header containing performance parameters, and FIG. 9B is a diagram showing a payload;

FIG. 10 is a diagram showing a list of backup masters (BMs) which may be selected, each in accordance with its master aptitude based on performance parameters;

FIG. 14A and FIG. 14B are diagrams illustrating an example of a packet of net trigger notification (NET Trigger), which is to be transmitted;

FIG. 15 is a diagram depicting the sequence of spontaneously or forcibly disconnecting the slave having the backup-master information from the previous master and then connecting the same to the new master in accordance with the backup-master information;

FIG. 18A and FIG. 18B are diagrams illustrating an example of a packet to be transmitted, which is a BNEP packet containing a list of backup-master (BM) information items;

FIG. 20A and FIG. 20B are diagrams illustrating an example of a BNEP packet to be transmitted, which contains a slave list.

BEST MODE FOR CARRYING OUT THE INVENTION

A communication processing apparatus, a communication processing system, a communication processing method, and a computer program, all according to this invention, will be described in detail with reference to the accompanying drawings.

A communication system will be first described with reference to FIG. 1. The system comprises a piconet that is a wireless communication network based on communication processing apparatuses that constitute the piconet.

As described above, the communication using Bluetooth is carried out in a network (piconet) that comprises a device called master, which controls the communication, and a plurality of devices called slaves, which receive and transmit data through the master. In accordance with Bluetooth, Bluetooth-device addresses are allocated to the devices, each identifying one device. Any device that is to transmit or receive data is identified with the Bluetooth-device address.

The piconet comprising a master and slaves can have up to seven slaves for the master. All devices belonging to the piconet are synchronized in terms of frequency axis (frequency hopping pattern) and time axis (time slot).

Figure 1:
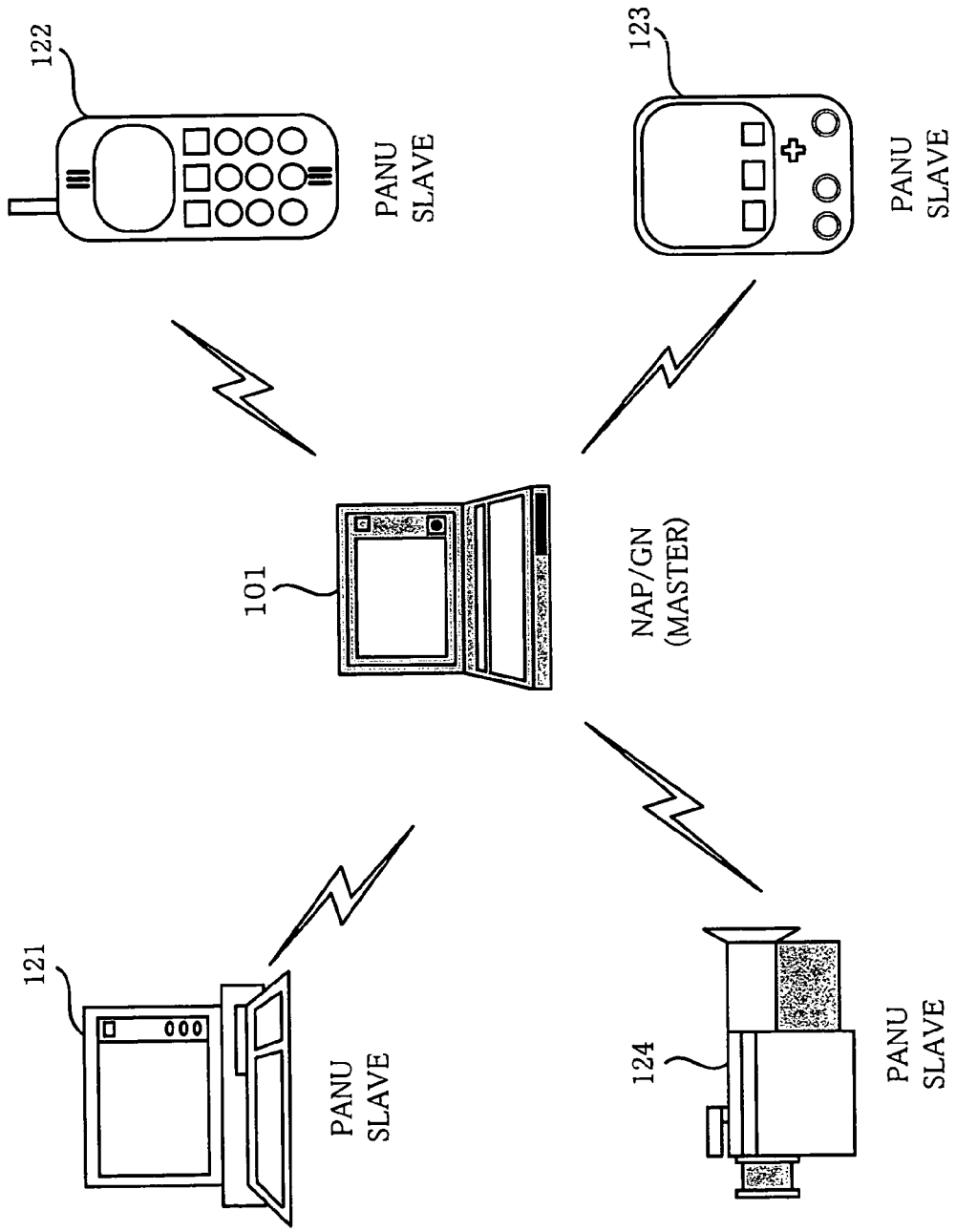
FIG. 1 is a diagram showing an example of a network that implements communication that uses Bluetooth.

FIG. 1 shows a piconet that comprises a personal computer (PC) 101 used as master and some other devices used as slaves, i.e., a personal computer (PC) 121, a mobile telephone 122, a PDA (Personal Digital Assistant) 123 and a video camera 124.

The piconet comprising one master and a plurality of slaves can be used as an independent network not connected to any external network (in ad-hoc mode). Alternatively, it can be connected to any other network, such as the Internet or other piconets, via the master (in infrastructure mode).

The piconet is called "personal area network (PAN)." Each slave is called "PANU (PAN user)." The piconet may be connected to an external network (in infrastructure mode). In this case, the master makes routing of communication packets slaves, and also exchanges packets with the external network. Thus, the master is called "NAP (Network Access Point)." The piconet may not be connected to any external network (in ad-hoc mode). If this is the case, the master makes routing of communication packets between the slaves of the piconet. Thus, it is called "GN (Group Ad-hoc Network)."

Bluetooth defines specification known as "profile," for any data to be transmitted or received by wireless communication, and for the procedure of wireless communication. The profile describes the service that each device can provide. The PAN (Personal Area Network) profile describes a method of achieving communication between the slaves of a piconet. The devices belonging to the piconet constituted on the basis of the PAN profile can transmit and receive various types of data, using the piconet as a network.

The personal computer (PC) 101, personal computer (PC) 121 as a slave, mobile telephone 122, PDA (Personal Digital Assistant) 123 and video camera 124, all shown in FIG. 1, incorporate a Bluetooth module each. They can transmit and receive various data items to and from one another, by means of wireless communication based on the Bluetooth standards.

The devices, i.e., the master and the slaves, have a Bluetooth module that carries out wireless communication based on the Bluetooth standards. More specifically, the module adopts a time-division multiplex system that uses a 2.4-GHz ISM band to perform wireless communication by means of frequency hopping spectrum diffusion in the ISM band.

The configuration of the Bluetooth module will be described, with reference to FIG. 2. A CPU 201 loads the control program stored in a ROM 202 into a RAM 203 and then controls a Bluetooth module 200 as a whole. The CPU 201 functions as a data-processing means or a communication control means. The CPU 201 to the RAM 203 are connected to one another by a bus 205. To the bus 205, there is connected a flash memory 204.

The flash memory 204 stores, for example, the names of the Bluetooth devices set as master and slaves in the piconet, the Bluetooth-device addresses unique to the Bluetooth devices, and the like.

The Bluetooth-device addresses are 48-bit indentifiers, each being specific, or unique, to one Bluetooth device. Hence, they are used in various processes relating to the management of the Bluetooth devices.

To establish the devices synchronous in the piconet, for example, all slaves must have acquired the information about the frequency-hopping pattern of the master. Each slave figures out the frequency-hopping pattern beforehand, on the basis of the Bluetooth-device address of the master.

Figure 3:
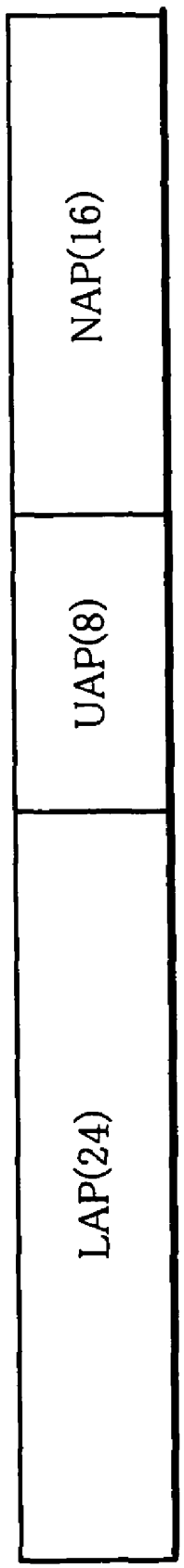
FIG. 3 is a diagram explaining a Bluetooth-device address.

To be more specific, a Bluetooth-device address consists of a 24-bit low-address part (LAP), an 8-bit upper-address part (UAP), and a 16-bit non-significant address part (NAP), i.e., the remaining 16 bits, as is illustrated in FIG. 3. Twenty-eight (28) bits, i.e., entire LAP (24 bits) and the lowest 4 bits of the UAP, are used to figure out the frequency-hopping pattern.

Each slave can figure out a frequency-hopping pattern from the 28-bit part of the Bluetooth-device address of the master and a Bluetooth clock notified by the master. Note that the Bluetooth-device address of the master has been acquired by the paging performed to establish the intra-piconet synchronization.

Referring to FIG. 2 again, the flash memory 204 stores a link key and the like. The link key authenticates Bluetooth devices that are to communicate with one another after the intra-piconet synchronization is established, or encrypts the data to be transmitted. The link key is supplied to the CPU 20, whenever necessary.

An input/output interface 206 controls the input and output of the data supplied in accordance with the instructions from the CPU 201 and also the input and output of the data supplied from a base-band control unit 207.

The base-band control unit 207 performs various controls and various processes. The controls the unit 207 performs includes the control of a transceiver 208, the control of a link, the control of packets, the control of logic channels, and the control of security. The processes the unit 207 performs includes error-correction encoding and decoding and data randomizing. The unit 207 converts the data supplied from the input/output interface 206, into analog data, which is output to the transceiver 208. The unit 207 also converts a signal supplied from the transceiver 208, into digital data. The digital data thus obtained is output to the input/output interface 206.

The transceiver 208 comprises a GFSK (Gaussian Frequency Shift Keying) modulation unit, a GFSK demodulation unit, a spectrum-diffusion unit, an inverse spectrum-diffusion unit or a hopping synthesizer unit, and the like. It performs various processes on a signal supplied from the base-band control unit 207 and supplies the signal processed to an antenna 209. It performs various processes on a signal supplied from the antenna 209, too, and outputs the signal processed to the baseband control unit 207.

The GFSK modulation unit of the transceiver 208 selects the highland component of the data supplied from the base-band control unit 207, by using a filter, and performs frequency modulation, or primary modulation, on the high-band component, generating data. The data, thus generated, is output to the spectrum-diffusion unit. The spectrum-diffusion unit switches the carrier frequency on the basis of the frequency-hopping pattern which has been figured out by using 28 bits i.e., entire LAP (24 bits) and the lowest 4 bits of the UAP, as indicated above, and which has been notified from the hopping synthesizer unit. The spectrum-diffusion unit then performs spectrum diffusion on the data it has received, and outputs the data to the antenna 209. In Bluetooth, the spectrum-diffusion unit is designed to cause frequency hopping every 625 microseconds, thereby to transmit data.

The inverse spectrum-diffusion unit of the transceiver 208 performs the hopping of the receipt frequency, in accordance with the frequency-hopping pattern notified from the hopping synthesizer unit. Thus, the inverse spectrum-diffusion unit acquires, for example, a signal transmitted from the slave with which the transceiver is communicating. The inverse spectrum-diffusion unit performs inverse spectrum-diffusion on the signal acquired, thus reproducing the signal transmitted from the slave, and output this signal to the GFSK demodulation unit. The GFSK demodulation unit effects GFSK demodulation on the signal supplied from the inverse spectrum-diffusion unit, generating data. The data is output to the baseband control unit 207.

The transceiver 208 uses the 2.4-GHz band and transmits the signal that has undergone spectrum diffusion, from the antenna 209. The transceiver 208 outputs the signal received from the antenna 209, to the inverse spectrum-diffusion unit.

Figure 2:
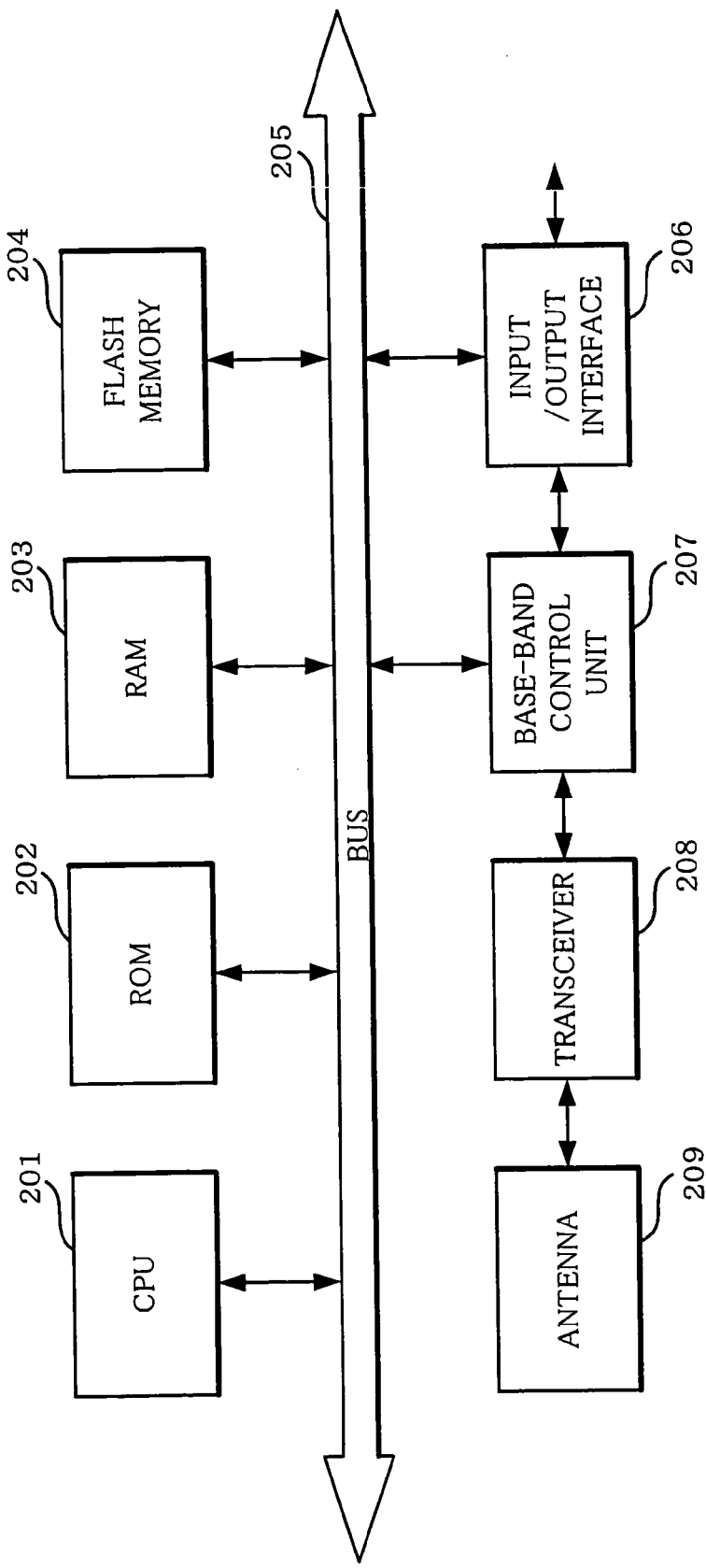
FIG. 2 is a diagram illustrating a Bluetooth module.

Each of the communication processing apparatuses that constitute the piconet has a module of the same configuration as the Bluetooth module 200 shown in FIG. 2. Each communication processing apparatus carries out the processes described above, thus accomplishing data communication.

Figure 4:
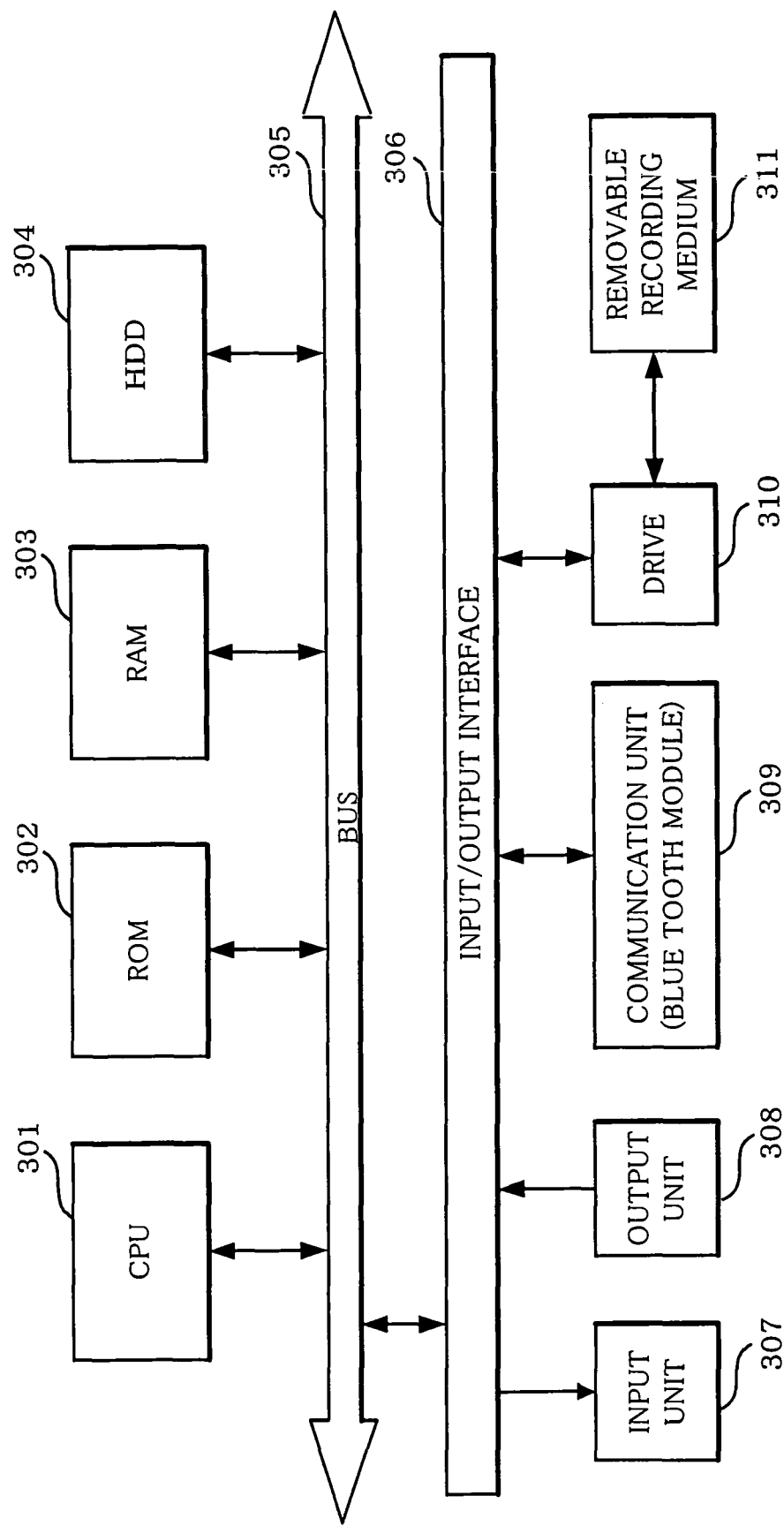
FIG. 4 is a diagram explaining a communication processing apparatus that has the Bluetooth module.

The communication processing apparatuses constituting the piconet, i.e., the devices each having a Bluetooth module of the type described above, will be described with reference to FIG. 4. FIG. 4 is a block diagram showing a personal computer that is an example of a communication processing apparatus that acts as master or a slave in the piconet. The configuration shown in FIG. 4 will be explained below.

A CPU (Central Processing Unit) 301 performs various processes in accordance with the programs stored in a ROM (Read Only Memory) 302, an HDD 304, or the like. Namely, it works as a means or a communication control means. A RAM 303 stores, if necessary, the programs and data that the CPU 301 executes and uses. The CPU 301, ROM 302, RAM 303 and HDD 304 are connected to one another by a bus 305.

To the bus 305, an input/output interface 306 is connected. To the input/output interface 306 there are connected an input unit 307, an output unit 308, a communication unit 309, and a drive 310. The input unit 307 comprises a keyboard, switches, buttons, and a mouse, which are operated by the user. The output unit 308 comprises an LCD or a CRT, speakers and the like. The communication unit 309 is the Bluetooth module described with reference to FIG. 2 and functions as a means for transmitting and receiving data. The drive 310 can hold a removable recording medium 311, such as a magnetic disc, an optical disc, an opt-magnetic disc, or a semiconductor memory, and can read and write data in and from the removable recording medium 311.

Shown in FIG. 4 is a personal computer (PC), which is an example of a communication processing apparatus that may be used as master or a slave in the piconet illustrated in FIG. 1. The communication processing apparatus used as master or a slave in the piconet is not limited to PCs, nevertheless. As seen from FIG. 1, the communication processing apparatus can be a mobile communication terminal such as a mobile telephone or a PDA, a video camera, or any other type of an information-processing apparatus. That is, the device has a unique hardware As will be detailed below, the communication processing apparatus that works as master in this invention needs to have data-receiving means, a data-processing means, and a data-transmitting means. The data-receiving means receives, from each slave, the data containing performance parameters that represent the data-processing performance items evaluated of the slave. The data-processing means figures out the master aptitude of each slave from the performance parameter it has received from the slave. Based on the master aptitudes thus figured out for all slaves, the data-processing means selects one slave as a backup master, i.e., the next master. The data-transmitting means transmits, to all slaves, the backup-master information containing the address information and synchronization information about the backup master determined by the data-processing means. These components are the hardware items that are illustrated in FIG. 2 and FIG. 4. The processes that the components perform will be explained below in detail.

The communication processing apparatus according to the invention, used as a slave, is set as one that comprises a data-processing means, a data-transmitting means, data-receiving means, a memory means and a connection control means. The data-processing means generates a packet containing performance parameters that represent the data-processing performance items evaluated of the slave. The data-transmitting means transmits the packet generated by the data-processing means, to the master. The data-receiving means receives, from the master, backup-master information containing the address information and synchronization information about a device that corresponds to a backup master. The memory means stores the backup-master information that the data-receiving means has received. The connection control means connects the slave to the backup master in accordance with the backup-master information that the memory means has stored. These components are the hardware items that are illustrated in FIG. 2 and FIG. 4. The processes that the components perform will be explained below in detail.

In a piconet of the type that comprises one master and a plurality of slaves as is illustrated in FIG. 1, each communication processing apparatus, used as either as master or a slave, performs a sequence of setting a network, as will be described below. The sequence starts with the process of setting one of the slaves set in the piconet, as a backup master (BM), i.e., a candidate for the master, and ends with the process of making the backup master takes over the master function from the master if the master is removed from the network, to control the communication between the slaves belonging to the same piconet.

Figure 5:
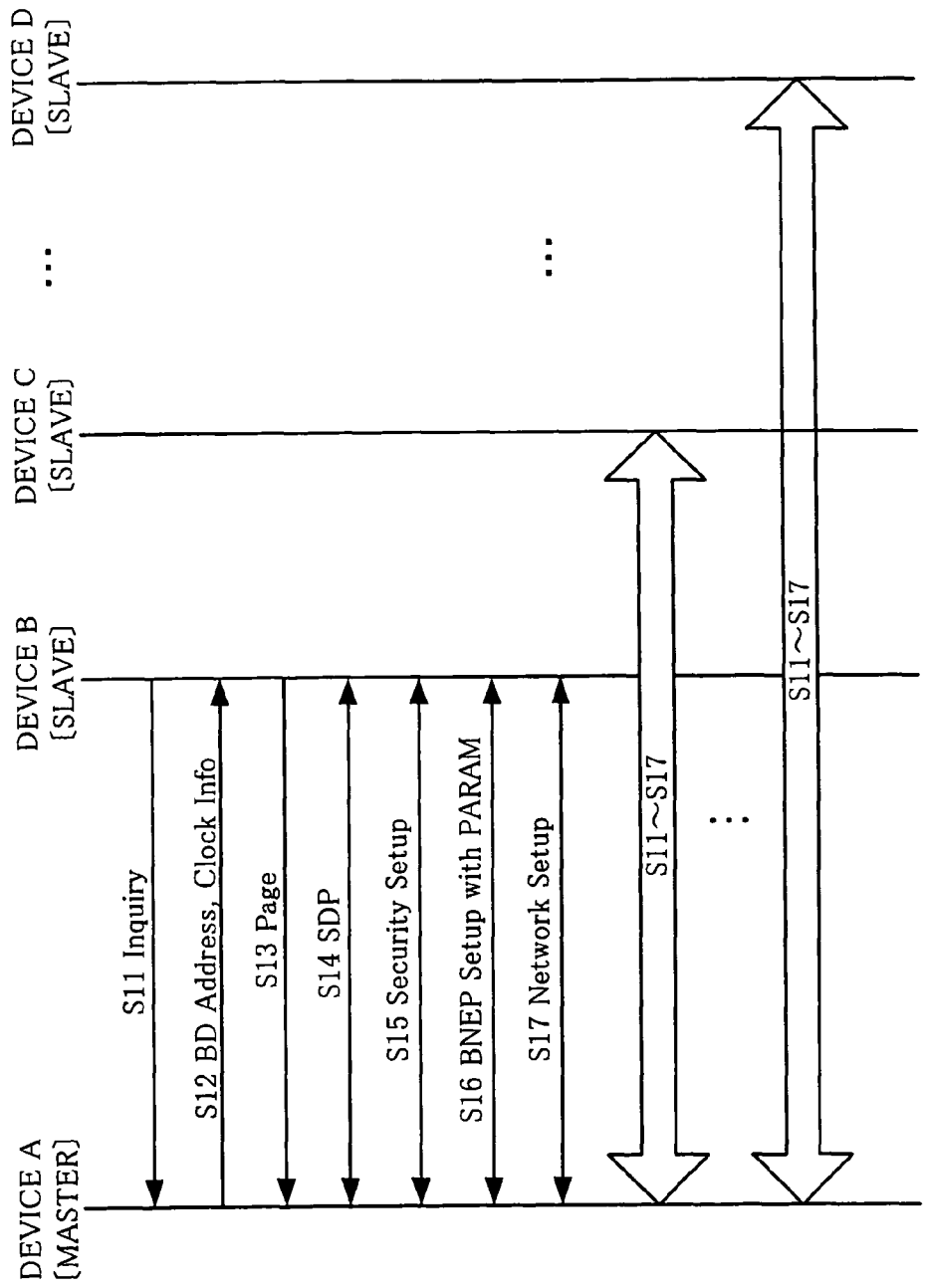
FIG. 5 is a diagram depicting the process sequence of setting up a piconet that comprises a device A set as master and device B to G used as slaves.

FIG. 5 is a diagram depicting the process sequence of setting up a piconet that comprises a device A set as master and devices B to G used as slaves.

First, in Step S11, the device B functioning as a slave transmits an inquiry by broadcasting. The broadcast transmission of the inquiry is the first-stage process that the master performs to establish the intra-piconet synchronization after determining that slaves exist around it. At this time, however, it is not clear whether a master exists in the piconet. This is why the device B functioning as a slave acts as a provisional master and transmits the inquiry by broadcasting. That is, the inquiry is transmitted by broadcasting, in order to confirm the existence of the master and to acquire the address of the master (i.e., Bluetooth-device address: BD-Address) and also synchronization information transmitted from the master.

In Step S12, the device A, which acts as master and which has received the inquiry, supplies its address (i.e., Bluetooth-device address: BD-Address), clock information and the like to the device B. The clock information servers to achieve synchronous communication between the master and any slave.

Next, in Step S13, the device B functioning as a slave performs paging to the device A that is acting as master. The paging is the second-stage process that is performed to establish the intra-piconet synchronization. This process accomplishes synchronization between the master and a specific slave, that is, between the device B and the device A in this instance.

"Paging" is a process of first designating a specific Bluetooth device to demand that Bluetooth communication be started, and then transmitting and receiving various data items to establish the synchronization. More precisely, the master and the slave exchange their attribute information items (FHS packets). The master and the slave are rendered synchronous in terms of frequency axis and time axis, on the basis of the attribute information items exchanged.

In the piconet, the master and the slave that carry out Bluetooth communication between them have a clock (Bluetooth clock) each. The slave needs to make its clock comply with the clock of the master (i.e., Bluetooth clock). It is paging that causes the clock of the slave to comply with that of the master. The paging is effected in three phases. The first phase is page-transmitting. The second phase is page-scanning. The third phase is page-responding. The paging, thus effected, adjusts the clock of the master and the clock of the slave to each other, establishing the synchronization. At this time, the device B and the device A operate in synchronism, acting as master and a slave, respectively. However, the device A has been set as master. A process is, therefore, performed to cause the devices A and B to operate in synchronism, respectively as master and a slave. This process is called "master-slave conversion."

Then, in Step S14, a process is performed between the master (device A) and the slave (device B), which have been made to operate in synchronism, by using SDP (Service Device Protocol). SDP determines service that is effective at this time. SDP is a protocol that searches for the function or service that the master and slave, used as communication processing apparatuses in the piconet, can provide. SDP can therefore determine the service that the master and slave can provide, such as reproduction of music data, access to the network, or the like. Any apparatus that has a Bluetooth module stores, in a database, the information about the service it can offer, reads this service information from the database, and provide the service information.

Next, in Step S15, the process of setting up security is carried out between the master (device A) and the slave (device B). To be more specific, the security setup process is to set a link key that manages the mutual security of the master (device A) and slave (device B). The link key is applied to authenticate the master and the slave, both being Bluetooth devices that communicate with each other, and to encrypt the data to be transmitted or received from and to either Bluetooth device.

Hitherto, the above-mentioned sequence of processes is performed between the master and each slave in the piconet, thus achieving inquiring and paging to set a communication environment for the master and each slave. Once the communication environment is so set, SDP determines the service information and sets the link key, thereby establishing security in preparation for the communication between the master and the slave. Thereafter, the master first activates the service when it receives a communication request for the service selected by the slave, and then starts the process of establishing the communication.

After the preparation process, the communication is effected in the piconet, through the master. After the use of the service any slave provides is started, the master (device A) may be removed from the network or the power may run out in the battery. In this event, the slaves can no longer communicate with one another via the master. To resume the communication between the slaves, the user needs to set a new master, or reconstruct the piconet.

To resume the communication, the following steps S16 et seq. are carried out in the present invention:

(1) Process of acquiring performance parameters, or performance information, from the slaves, by means of the master.
(2) Process of setting the next master, or backup master (BM), on the basis of the performance parameters acquired from the slaves.
(3) Process of supplying the backup-master (BM) information to each slave.

These processes will be described below in detail. In the sequence diagram of FIG. 5, the master (device A) performs a BNEP setup process for the slave (device B) that has completed the synchronization, the security setup and the SDP process.

BNEP stands for "Bluetooth Network Encapsulation Protocol." This protocol makes it possible to transfer Ethernet packets in the form of capsules on the Bluetooth L2CAP. BNEP packets are packets that are used as control packets or data packets to be transmitted by using BNEP.

Figure 6:
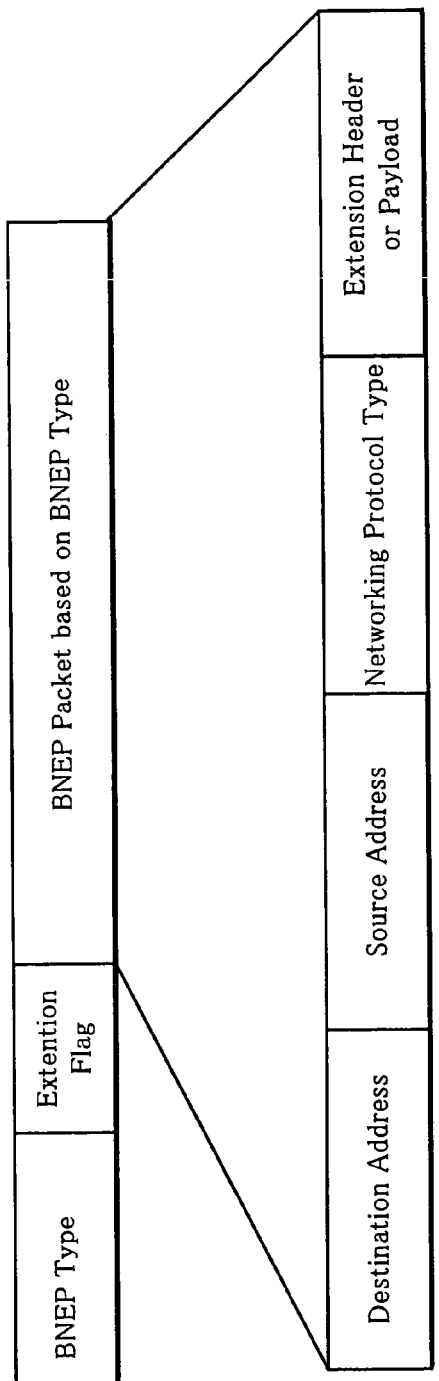
FIG. 6A and FIG. 6B are diagrams explaining a BNEP packet.

BNEP packets have the configuration shown in FIG. 6A and FIG. 6B. FIG. 6A represents the BNEP packet and the header affixed to the BNEP packet. FIG. 6B depicts the configuration of the BNEP packet.

In the header to the BNEP packet, a BNEP type and an extension flag are set. The BNEP type may be [CONTROL]

or the like, which indicates that the packet is a [GENERAL ETHERNET] packet, a [COMPRESSED ETHERNET] or a control packet. The extension flag is information that indicates whether the BNEP packet has an extension header (1=header existing, 0=header not existing). A header that accords with the BNEP type follows the extension flag. Further, an extension header is added, if any. A payload that accords with the BNEP type is stored, next to the extension flag.

FIG. 6B illustrates an example of a payload. The BNEP packet comprises a destination address, a source address, a networking protocol type, an extension header, if any, and a payload. The destination address and the source address are, for example, Bluetooth-device addresses (BD addresses). The networking protocol type is, for example, a protocol type that accords with the Ethernet.

In the present invention, each slave in the piconet transmits a BNEP packet (or control packet) to the master, the packet containing the performance parameter representing the performance value of the slave. The master evaluates the master aptitude that the slave has, from the performance parameter it has received from the slave. From the master aptitude thus evaluated, the master then determines whether the slave can be used as next master and determines which slave should be used as a backup master (BM).

Figure 7:
FIG. 7 is a diagram representing the format of an expansion header to be set in the BNEP packet.

FIG. 7 shows the format of the extension header that is added to the BNEP packet. The extension header contains an extension type, an extension flag, an extension length and a payload (extension payload). The extension type represents the type of transmission of a performance parameter or the type of transmission of a backup-master information and the like. The extension flag indicates whether the packet has any other extension header (1=header existing, 0=header not existing). The extension length represents the length of the extension header. A control packet, for example, can be added, as an extension header, to any other BNEP packet.

FIG. 8 shows examples of performance parameters to be transmitted from a slave to the master in the network (i.e., piconet). The performance parameters are values evaluated of the slave. They can be used as indicators to determine whether the data-processing performance items of the slave enable the slave to be selected as master.

In the examples shown in FIG. 8, the remaining battery power, the CPU performance, the memory resource, the electric-field intensity (RSSI: Radio Signal Strength Indicator), and the information showing whether the slave can be set as master are the data-processing performance items that are used as performance parameters. The performance parameters include parameter identifiers 0×01 to 0×05, respectively. Note that "0×" means that each parameter identifier is a hexadecimal number.

Of the performance parameters, the remaining battery power to the RSSI may have a value ranging from 0×00 to 0×FF (1 byte=256 possible values) on the basis of the parameter-evaluation reference values held in slaves. These parameters may indicate the lowest performance=00, and the highest performance=FF.

More precisely, the remaining battery power is set as a performance parameter having value FF indicating the highest performance, if the slave is connected to an AC power supply and is therefore continuously supplied with electric power. The slave may use a rechargeable battery, a cell or the like. In this case, the performance parameter ranges from 00 to FF in accordance with the power that remains in the battery, cell or the like. These reference values are held, as common data, in all slaves. necessary, to the slaves.

The CPU performance is a performance parameter that is set in accordance with the type and operating clock frequency of the CPU. This performance parameter has a specific value set, also in accordance with the data common to all slaves.

The memory resource is a performance parameter that is set in accordance with the storage capacity which remains in the flash memory and RAM provided in the slave and which can be effectively used. This performance parameter has a specific value set also in accordance with the data common to all slaves.

The electric-field intensity (RSSI) is a performance parameter that is set in accordance with the electric-field intensity (RSSI) determined from the condition of the Bluetooth communication between the slave and the master. This performance parameter has a specific value that is set also in accordance with the data common to all slaves.

The master aptitude, or master-aptitude information, is a performance parameter that has a specific value if the slave cannot be set as master because it cannot make routing of packets between the other slaves or because the user has set it as a slave that cannot be used as master. If the slave can be used as master, the master aptitude has another specific value indicating that the slave can be set as master. This performance parameter may have a value ranging from 0×00 to 0×FF. Alternatively, it may have the value indicating that the slave can be used as master, or the value indicating that the slave cannot be used as master.

As described above, the piconet comprising one master and a plurality of slaves can be an independent network (in ad-hoc mode) that is not connected to any external networks, or a network (in infrastructure mode) that is connected to any other network, such as the Internet or another piconet, through the master. While the piconet remains connected to any other network (in infrastructure mode), the master makes routing of packets between the slaves constituting the piconet, thus achieving the packet exchange within the piconet, and also accomplishing packet exchange with the external networks. Thus, the master is called "NAP (Network Access Point)." While the piconet remains an independent network (in ad-hoc mode), not connected to the external networks, the master makes routing of packets between the slaves constituting the piconet. In this case, the master is called "GN (Group Ad-hoc Network)."

The master may be connected to any other network, thus functioning as a NAP, or may not be connected to any other network, thus functioning as a GN only. The information showing whether the master can function as a NAP or function as a GN only can be set as master-aptitude information. In this case, the master-aptitude information has one of the following four performance-parameter values:

(a) Non-master aptitude
(b) Master aptitude, either as NAP and GN
(c) Master aptitude, as GN only
(d) Master aptitude, as NAP only FIG. 8 shows the remaining battery power, CPU performance, memory resource, electric-field intensity (RSSI: Radio Signal Strength Indicator) and master aptitude, i.e., the information items that are exemplified as performance parameters. Only some of these information items may be applied. Otherwise, information items other than these may be applied.

To transmit the information representing the values of these performance parameters to the master, an extension header (see FIG. 8) descried with reference to FIG. 7 is added to a BNEP packet. The parameter identifiers (PARAMs) and the values (indices) of the performance parameters are incorporated, as a payload, into the extension header. The BNEP packet is then transmitted to the master.

The extension type and payload of the extension header of a packet which is to be transmitted and which contains the performance parameters will be described, with reference to FIG. 9A and FIG. 9B.

As FIG. 9A shows, the extension type is set to [BNEP Extension Control], which indicates that a control packet should be transmitted.

As 9B depicts, the payload (Extension Payload) contains head data and subsequent data. The head data consists of [NET PARAM] and [PARAMNUM]. [NET PARAM] indicates that the payload contains performance parameters to be transmitted, and [PARAMNUM] represents the number of parameters contained in the payload. The subsequent data consists of different performance parameters, each composed of a parameter identifier (PARAM) and a performance parameter value (INDEX). These performance parameters may be transmitted in the form of an ordinary control packet.

As seen from FIG. 9B, the number (PARAMNUM of parameters to be transmitted is [0×05] for the head data, indicating that the payload contains five parameters. The data item [0×01] [0×2C] follows [0×05]. As is clear from FIG. 8, [0×01] is the remaining battery power, and [0×2C] is the value of the performance parameter for the remaining battery power.

Further, [0×02] [0×C3] indicates that the value of the performance parameter of the CPU performance is [0×C3]; [0×03]. [0×38] indicates that the value of the performance parameter of the memory resource is [0×38]; and [0×04] [0×8A] indicates that the value of the performance parameter of RSSI is [0×8A]. Moreover, [0×05] [0×01] is data that is a response to the inquiry of whether the slave can be set as master. For example, [0×01] indicates that the slave can be master that can function as both NAP and GN.

Referring to the sequence diagram of FIG. 5 again, the device B working as a slave transmits a control packet to the master (device A). The extension header of the control packet contains a payload that consists of the above-mentioned performance parameters. Upon receipt of the control packet, the master (device A) starts performing the service assigned to it. Namely, the master performs the process of establishing communication (Step S17).

Steps S11 to S17 are carried out for all the slaves provided in the piconet. That is, the above-described procedure is performed between the devices B to G functioning as slaves, on the one hand, and the master (device A), on the other. The master accumulates the values of the performance parameters of each slave existing in the piconet. When a new slave may join the piconet, the same procedure is executed, and the master acquires performance parameters from the new device added to the piconet. Any slave device may change in operating condition. In this case, the slave device transmits a control packet or BNEP packet, the extension header of which contains the performance parameters updated, to the master.

In accordance with the performance parameter acquired from the slaves, the master sets one of the slaves, as a backup master (BM), or a candidate for master.

The process of setting a slave as a backup master (BM) will be explained below. Assume that the master has already acquired the parameters, i.e., the remaining battery power to the master aptitude, from all slaves.

First, any slave whose master aptitude is negative is rejected as a backup-master (BM) candidate. The remaining slaves, each having an affirmative master aptitude, are compared in terms of the other performance parameters. In other words, the master first figures out the master aptitudes of these slaves based on the performance parameters it has received from the slaves and then selects one of the slaves as backup master, i.e., the next master, in accordance with the master aptitudes figured out.

More specifically, weight coefficients ($\alpha$ to $\delta$) are assigned to (1) remaining battery power to (4) RSSI, respectively. The weight coefficients are applied to figure out the master aptitude of each slave from the parameters (1) to (4) acquired. The master aptitude of the slave (device B), B(BM), for example, is figured out as expressed by the following equation:

$$B(BM)=\alpha B1+\beta B2+\gamma B3+\delta B4$$

where B1, B2, B3 and B4 are (1) remaining battery power, (2) CPU performance, (3) memory resource and (4) RSSI of the slave (device B).

The master aptitudes C(BM) to G(BM) of the other slaves, i.e., devices C to G, are figured out in the same way as that of the slave (device B). The master can adjust the weight coefficients $\alpha$ to $\delta$, to select one slave as backup master, in accordance with the operating condition of the network.

After figuring out the master aptitudes of all slaves, the master selects one of the slaves, which has the highest of the master aptitudes B(BM) to G(BM) figured out, as backup master (BM). At the same time, the master generates a list that shows the slaves in the descending order of their master aptitudes (i.e., possibility as being used as backup master (BM)).

FIG. 10 shows such a list. This list shows the slaves arranged in the descending order of the master aptitude. The list contains the address (Bluetooth device (BD) address), page scan mode that is connection information and clock offset information of each slave. These information items have been acquired in the inquiry process and the paging process, both included in the sequence illustrated in FIG. 5.

The master figures out master aptitudes for the slaves, based on the performance parameters it has acquired from the slaves. The master selects, as backup master (BM), the slave for which the highest master aptitude has been obtained. Next, the master transmits the information concerning the backup master (BM), or the slave thus selected, to each slave.

Figure 11:
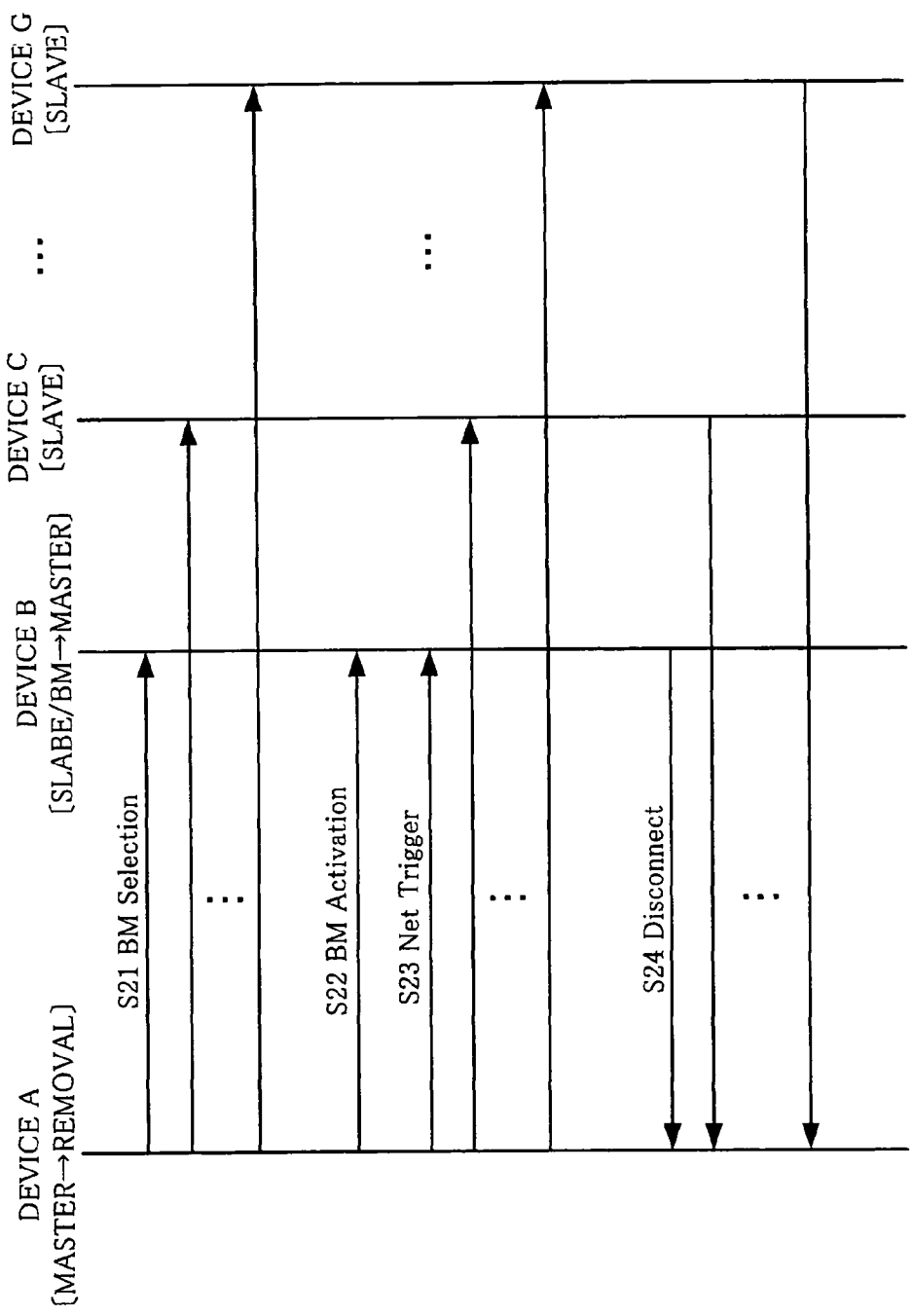
FIG. 11 is a diagram representing the process sequence, starting with the transmission of backup-master (BM) information from the master to a slave, and ending with the use of a backup master as master.

FIG. 11 shows the sequence that begins with the transmission of the backup-master (BM) information from the master to the slaves and ends with the transition of master function to the backup master. With reference to the sequence diagram, the processes constituting this sequence will be described in detail.

In Step S21 shown in FIG. 11, the master transmits the information about the device for which the highest master aptitude has been figured out and which has been therefore selected as backup master (BM), to each slave. Thus, the master notifies BM selection to the slaves. The backup-master (BM) information is transmitted to the slaves, as a data item contained in a BNEP control packet.

The configuration of the BNEP control packet containing the backup-master (BM) information will be explained with reference to FIG. 12.

Figures 12A, 12B:
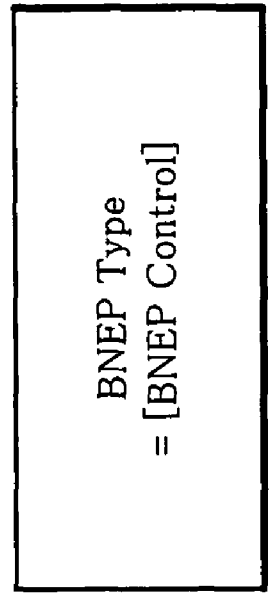
FIG. 12A and FIG. 12B are diagrams illustrating an example of a packet of backup-master (BM) information, which is to be transmitted.

As FIG. 12A shows, [BNEP CONTROL] is set in the BNEP type (BNEP Type), indicating that the packet is a control packet.

As FIG. 12B depicts, [NET BM SELECTION] is set in the BNEP payload, indicating that the backup master (BM) information is being transmitted. In the BNEP payload, [NET BM SELECTION] is followed by Bluetooth-device address (BD ADDR), page scan mode (PageScanMode), clock offset (ClockOffset), and connection backoff time (Connect Backoff Time). The Bluetooth-device address is the address of the slave selected as backup master (BM). The page scan mode is information that must be used to make the slaves operate in synchronism with the backup master (BM). The connection backoff time causes the slaves to make connection requests (Page) at different times to the backup master (BM), i.e., the new master. The control packet may be transmitted in the form of an extension header that is added to the BNEP packet.

The connection backoff time (Connect Backoff Time) sets different backoff times to the slaves so that the slaves may not make connection requests at the same time. Nevertheless, the backoff time need not be notified to each slave if backoff times based on random numbers are set to the slaves. In this case, the slaves will not be connected to the master at the same time.

In Step S21 shown in the sequence diagram of FIG. 11, the backup-master information is transmitted to all slaves. The master (device A) may be soon removed from the piconet thereafter. In this case, in Step S22, the master transmits a backup-master activation notice (BM Activation) to the device B that has been selected as backup master.

A configuration that the packet containing the backup-master activation notice (BM Activation) may have will be described, with reference to FIG. 13A and FIG. 13B.

Figure 13A:
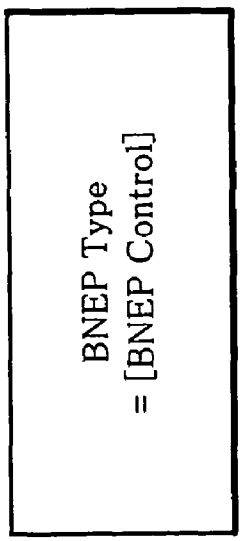
FIG. 13A and FIG. 13B are diagrams illustrating an example of a backup-master activation notice (BM Activation)

As FIG. 13A shows, [BNEP Control] is set in the BNEP type (BNEP Type), indicating that the packet is a control packet.

Figure 13B:
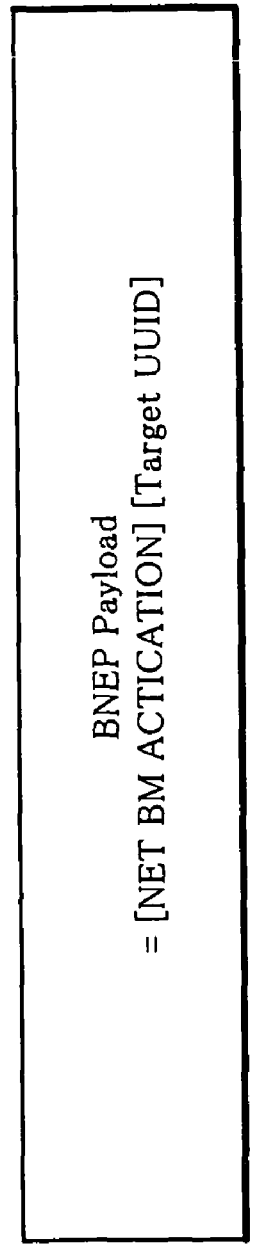

As FIG. 13B depicts, [NET BM Activation] is set in the BNEP payload (BNEP Payload) indicating the transmission of a backup-master activation notice. Further, [Target UUID)] is set in the BNEP payload, following [NET BM Activation]. [Target UUID] is type information that shows whether the master should be as a NAP (Network Access Point) or a GN (Group Ad-hoc Network). This control packet may be transmitted in the form of an extension header that is added to the BNEP packet.

As indicated earlier, a NAP (Network Access Point) is the master in a network (piconet) that is connected to any other network (in infrastructure mode). The NAP makes routing of packets between the slaves in the piconet. That is, it performs packet exchange within the piconet. In addition, the NAP effects packet exchange between the piconet and any external network connected to the piconet. If the piconet is independent, not connected to any external network (in Ad-hoc mode), the master functions as a GN (Group Ad-hoc Network) to make routing of communication packets between the slaves within the piconet.

Referring the sequence diagram of FIG. 11 again, the master (device A) transmits the backup-master information again to each slave just before the master is removed from the piconet. This is because a new slave may be incorporated into the piconet and the master (device A) may therefore receive performance parameters from the new slave and figure out master aptitudes for all existing slaves. Thus, the master sends the latest, or updated backup-master information to all slaves. Moreover, the master transmits a notice of net trigger (NET Trigger), informing that it will stop offering service as master.

A configuration of the notification of the net trigger (NET Trigger) will be described with reference to FIG. 14A and FIG. 14B.

As illustrated in FIG. 14A, [BNEP Control] is set in the BNEP type (BNEP Type), indicating that the packet is a control packet.

As shown in FIG. 14B, [NET Trigger] is set in the BNEP payload (BNEP Payload), indicating the transmission of a notice of the net trigger (NET Trigger). Further, [BD ADDR], [PageScanMode], [ClockOffset], [Target UUID] and [Delay before reconnect] are set in the BNEP payload, following [NET Trigger]. [BD ADDR] is the Bluetooth-device address of the backup master (BM) selected. [PageScanMode] is information that must be used to make the slaves operate in synchronism with the backup master (BM). [Target UUID] is type information that shows whether the master should be as a NAP (Network Access Point) or a GN (Group Ad-hoc Network). [Delay before reconnect] causes the slaves to make connection requests (Pages) at different times to the backup master (BM), i.e., the new master. This control packet may be transmitted in the form of an extension header that is added to the BNEP packet.

Like the connection backoff time (Connect Backoff Time) described above, [Delay before reconnect], or connection delay time, sets different backoff times to the slaves so that the slaves may not make connection requests at the same time. Nevertheless, the backoff time need not be notified to each slave if backoff times based on random numbers are set to the slaves. In this case, the slaves will not be connected to the master at the same time.

Next, in Step S24, each slave is disconnected (Disconnect) from the master (device A) which will be removed from the piconet, if the net trigger (NET Trigger) or the like has notified that the master will be removed from the piconet. If the net trigger has not notified the eventual removal of the master, no apparent disconnection of slaves will be performed when the power supply to the master is abruptly turned off. In this case, an ordinary timeout signal is generated, which indicates that the slaves have been disconnected from the master. If the master is abruptly removed from the piconet, the net trigger (NET Trigger) may not be notified in some cases.

In these cases, each slave has received the backup-master (BM) information transmitted to it in Step S21, i.e., the step of setting the piconet. Each slave can therefore perform paging (Page) to the backup master (BM) on the basis of the information it has received. The backup-master (BM) information contains synchronization information. Thus, each slave can be efficiently connected to the backup master, without carrying out the process of initially establishing synchronization.

The sequence of spontaneously or forcibly disconnecting the slave having the backup-master information from the previous master and then connecting the same to the new master in accordance with the backup-master information will be explained with reference to FIG. 15.

The sequence diagram of FIG. 15 illustrates how the device B operates as master when it receives the master activation notice from the device A after the previous master (device A) is removed from the piconet and then the device B is selected as backup master.

In Step S31, the slaves (device C to device G) perform paging (Page) to the new master (device B). In the ordinary connection process, the slaves must transmit an inquiry to search for the master and must acquire prescribed synchronization information, as has been described with reference to FIG. 5. In this case, the slaves have received the backup-master information from the previous master (in Steps S21 to S23 shown in FIG. 11). That is, they have acquired the address of the device B set as backup master and the synchronization information. The slaves can therefore communicate with the master by carrying out paging (Page); they need not transmit an inquiry. In the paging, the master and each slave exchange their attribute information items (i.e., FHS packets). The attribute information items, thus exchanged, render the master and the slave synchronous in terms of frequency axis and time axis.

Next, in Step S32, the slaves (device C to device G) transmit BNEP packets to the new master (device B), notifying performance parameters to the new master. This process is similar to Step S16 of the process sequence of FIG. 5. The slaves transmit performance parameters shown in FIG. 8 to the new master, in the form of packets that have the configurations described with reference to FIG. 6, FIG. 7 and FIG. 9.

Thereafter, the new master figures out master aptitudes for the slaves, based on the performance parameters received, in the same way as has been explained above. The new master selects one of the slaves as next backup master (BM). The new master then notifies the address of the slave selected as next backup master to the other slaves, together with the synchronization information of this slave.

In the piconet, the master thus selects one slave as backup mater, i.e., candidate for the next master, in accordance with the performance parameters it has received from the slaves. The master then notifies the address and synchronization information of the backup master, as backup-master information, to the slaves. From the backup-master information, the slaves can determine which device is the next master. Hence, synchronization can be immediately secured between the new master and the slaves, on the basis of the address information and synchronization information, both contained in the backup-master information. This minimizes the interruption of communication between the devices that constitute the piconet when the master device is removed from the piconet.

In the process sequence of FIG. 15, no steps are illustrated between Step S31 and Step S32. Nonetheless, the SDP (Service Device Protocol) process and the security-setup process are carried out after Step S31 and before Step S32.

The process of selecting a backup master and notifying the backup master selected will be described in detail. More precisely, the steps performed by the master will be described with reference to the flowchart of FIG. 16, and the steps performed in a slave will be described with reference to the flowchart of FIG. 17.

Figure 16:
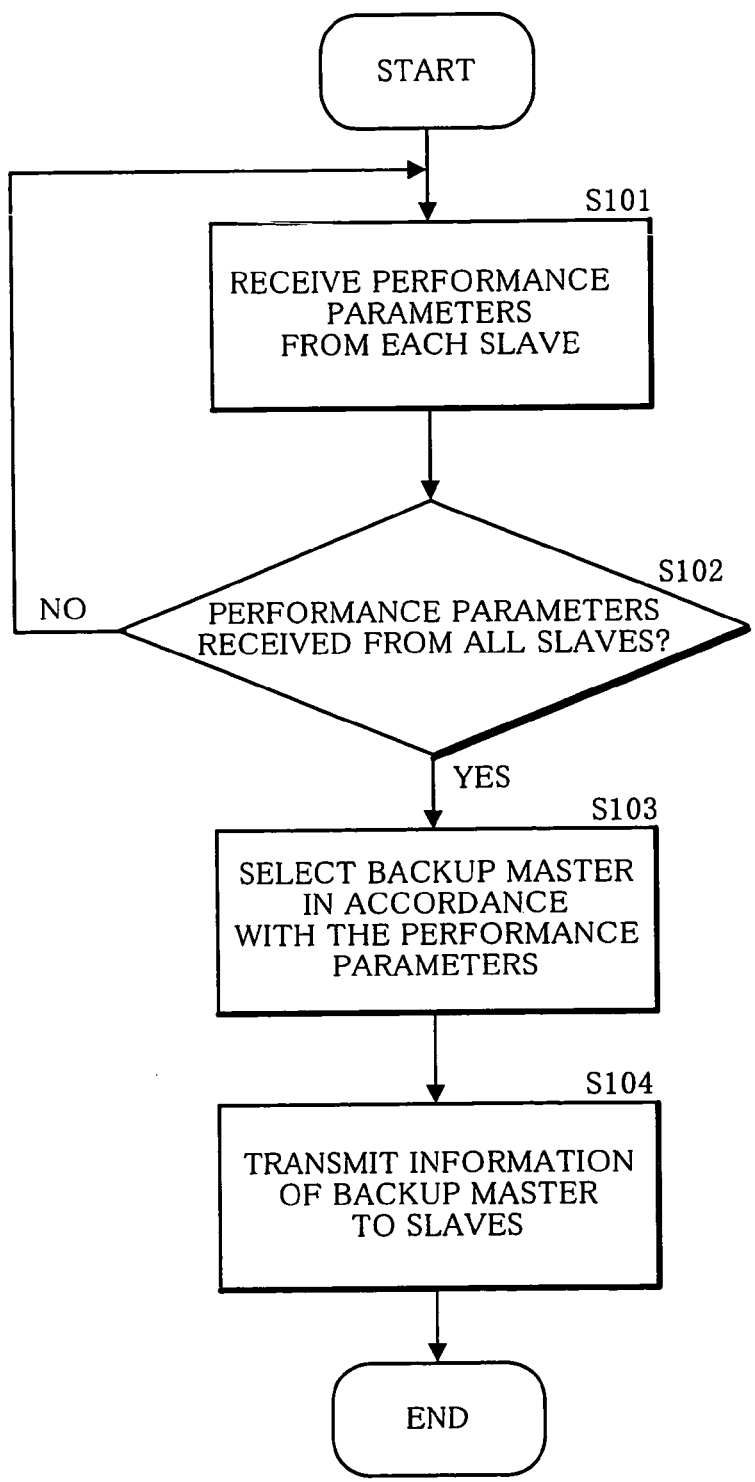
FIG. 16 is a flowchart explaining the principle of the process that the master performs to select a backup master and notify the selection thereof.

FIG. 16 is a flowchart explaining the gist of the process that the mater carries out in the piconet. First, in Step S101, the master receives performance parameters from each slave. The parameters represent the various performances of the slave, such as the remaining battery power, the CPU performance and the like.

In Step S102, the master determines whether it has received performance parameters from all slaves. If it has received the parameters from all slaves, the master evaluates the master aptitude of each slave on the basis of the performance parameters it has received from the slave. To be more specific, the master adjusts weight coefficients in accordance with the operating condition of the network, applies them to the various performance indicators of each slave, such as the remaining battery power and the CPU performance, and figures out mater aptitudes for each slave, from the performance indicators thus weighted. Then, in Step S103, the master selects the slave having the highest mater aptitudes, as backup master.

In Step S104, the master transmits the information of the backup master, i.e., the slave selected in accordance with its master aptitude, to the slaves. That is, the master transmits the address information and synchronization information of the backup master to the slaves. The master carries out the process shown in this flowchart, every time it receives performance parameters from any new slave or any existing slave. The master can, therefore, select a slave that can most appropriately operate as backup master in the present operating condition of the network.

Figure 17:
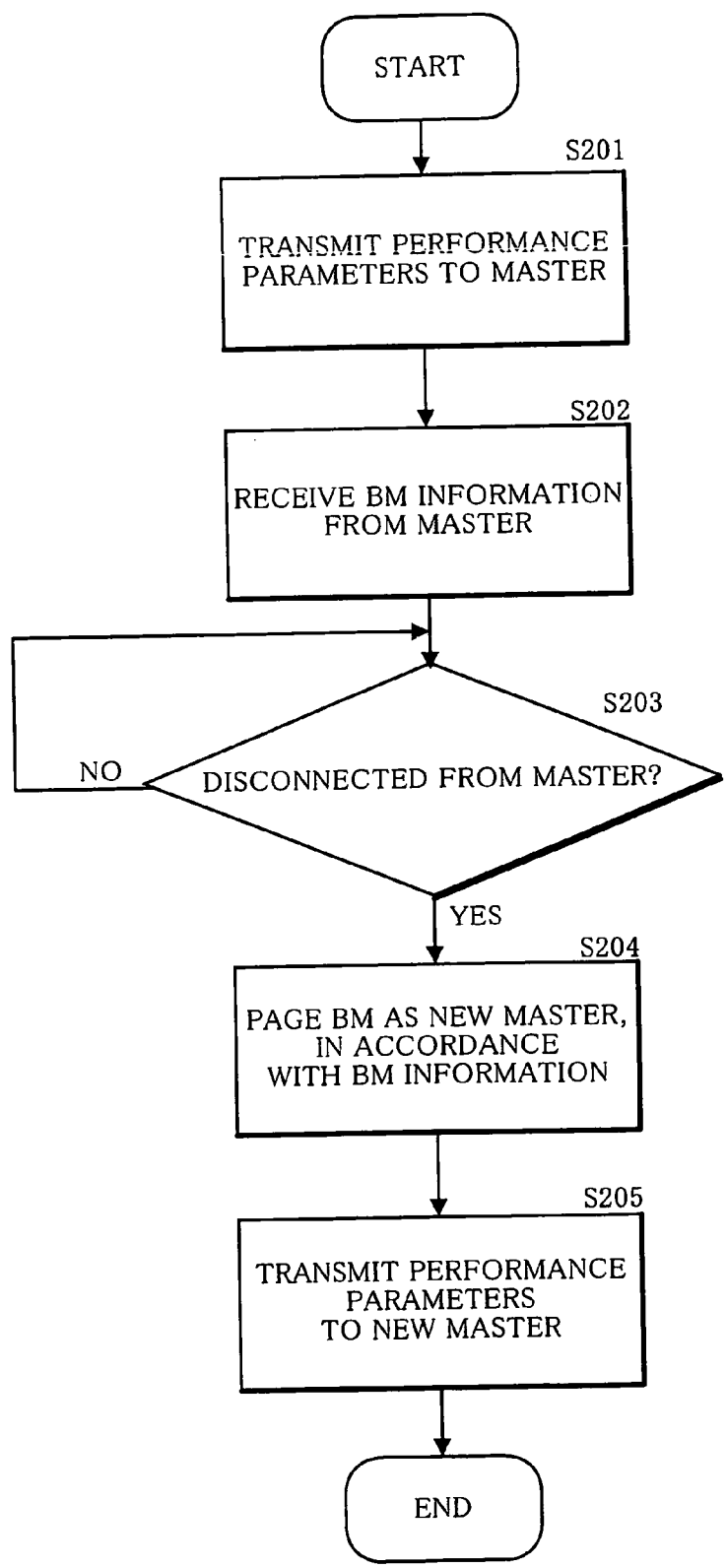
FIG. 17 is a flowchart explaining the principle of the process that a slave performs to select a backup master and notify the selection thereof.

How each slave operates in the piconet will be described, with reference to FIG. 17. In Step S201, the slave transmits performance parameters to the master. This step is to transmit the parameters representing the various performance items of the slave, such as the remaining battery power and the CPU performance, and contained in the extension header of a BNEP packet.

Next, in Step S202, the slaves receive backup-master information from the master. This information is stored into the memory unit provided in the slave. In Step S203, the slave determines whether it has been disconnected from the master. The slave may be spontaneously disconnected from the master when it receives a net trigger from the master (in Step S23 shown in FIG. 11) or disconnected due to an event on the part of the master, e.g., the power running-out of the battery or the removal of the master from the network. The operating condition of the slave may change, changing the performance parameters thereof. If this happens, Step S201 may be carried out.

In any case where the slave is disconnected from the master, it goes to Step S204. In Step S204, the slave performs the paging (Page) with respect to the backup master that is the new master. Thus, the backup master functions as master of the piconet.

Further, in Step S205, the slave transmits its performance parameters to the new master.

As described above, the slave receives the address information and synchronization information of the backup master from the backup master and holds them as backup-master information. From the backup-master information, the slave can determine which device is the next master after the master is removed from the piconet. This enables the slave to be connected to the new master and operate in synchronism therewith efficiently.

In the instance described above, the backup-master information that the master gives the slaves is concerned with only the device that has the highest master aptitude. Instead, the information may be a list showing the devices in the descending order of master aptitude. Once each slave has received this list as backup-master information, it acquires information about the other devices constituting the piconet. Thus, if any slave cannot be connected to the backup master having the highest master aptitude because this backup master has been removed from the piconet prior to the master, it can be connected to the backup master that has the second highest master aptitude.

A configuration of a BNEP packet, which contains the backup-master information provided in the form of such a list and which is to be transmitted to the slaves, will be described with reference to FIG. 18A and FIG. 18B.

As FIG. 18A shows, [BNEP Control] is set in BNEP type (BNEP Type), indicating that the packet is a control packet.

As FIG. 18B depicts, [NET BM LIST] and [LIST NUM] are set in the BNEP payload (BNEP Payload). [NET BM LIST] shows that the information to be transmitted is a list of backup masters (BMs). [LIST NUM] represents the number of the backup masters (BMs) shown in the list. Sets of data items [BD ADDR], [PageScanMode], [ClockOffset] and [Connect Backoff Time] are set in BNEP payload (BNEP Payload), after the [NET BM LIST] and [LIST NUM]. These data-item sets correspond to the backup masters shown in the list, respectively. The data items of each set are arranged in the order they are mentioned. [BD ADDR] represents the Bluetooth-device addresses of the backup masters (BMs). [PageScanMode] is information that enables the slaves to operate in page scan mode (PageScanMode), namely in synchronism with any backup master (BM). [Connect Backoff Time] makes the slaves to transmit connection requests (Pages) at different times to the backup master (BM), i.e., the new master. This control packet may be transmitted in the form of an extension header that is added to the BNEP packet.

In the embodiment described above, a slave performs the connection process with respect to the new master, i.e., the backup master. Instead, the backup master may carry out the connection process in accordance with the list, with respect to a slave. That is, the backup master may transmit the slave information about the slaves provided in the piconet so that it may be connected to a slave after the previous master is removed from the piconet.

The sequence of the connection process the backup master performs will be explained, with reference to FIG. 19.

Figure 19:
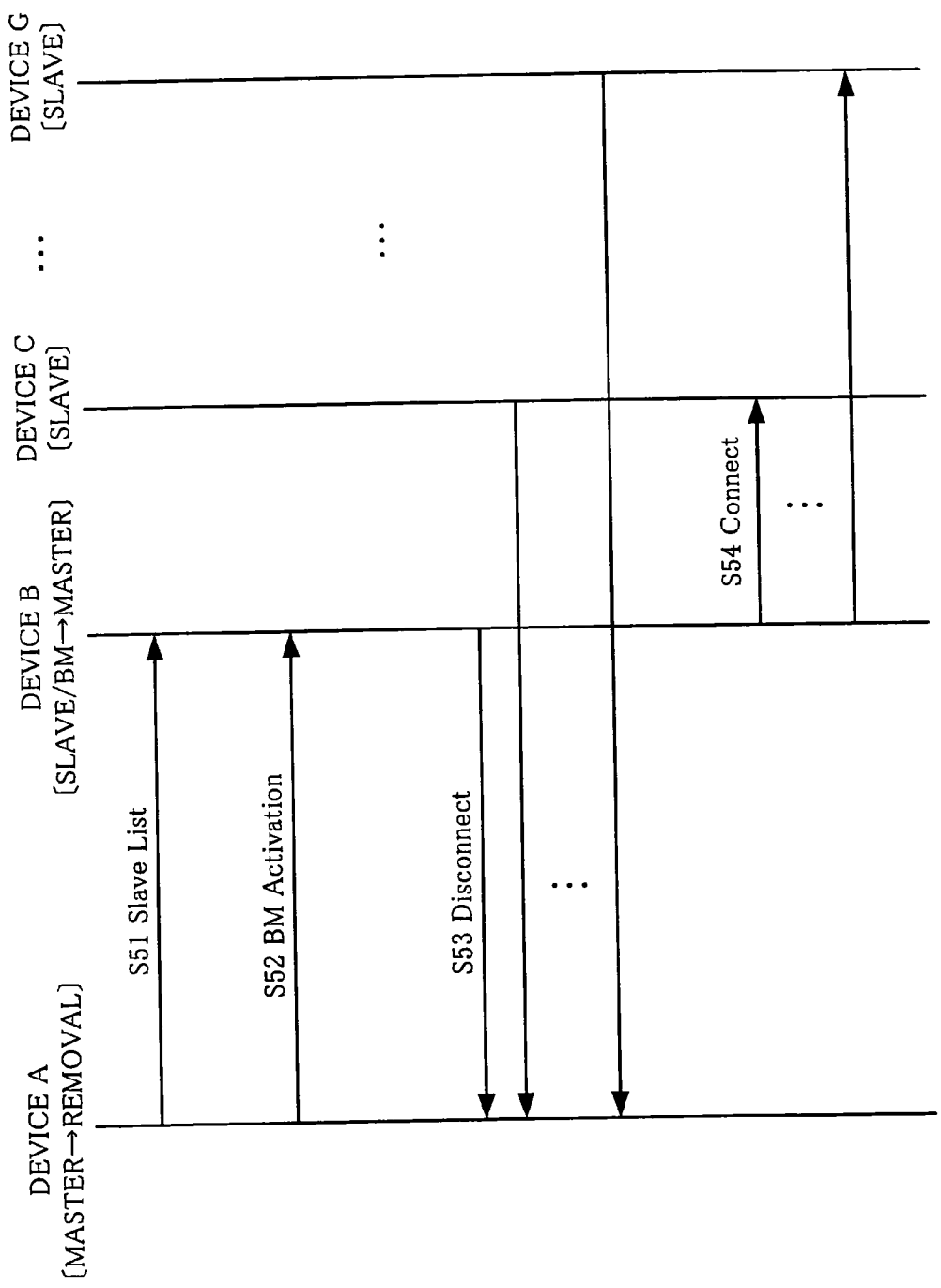
FIG. 19 is a diagram representing the process sequence in which a backup master is connected to each slave in accordance with a list.

The sequence diagram of FIG. 19 illustrates the steps that are performed after the device A, which is the existing master, selects the device B as backup master in accordance with the performance parameters.

In Step S51, the device A, or existing master, transmits to the device B, or backup master, a BNEP packet that contains a slave list (Slave List).

A configuration that the BNEP packet containing the slave list may have will be described with reference to FIG. 20A and FIG. 20B.

As seen from FIG. 20A, [BNEP Control] is set in the BNEP type (BNEP Type), indicating that the packet is a control packet.

As FIG. 20B shows, [NET SLAVES LIST] and [LIST NUM] are set in the payload (BNEP Payload). [NET SLAVES LIST] indicates that the list is a slave list. [LIST NUM] represents the number of slave information items to be transmitted in the form of a list. Sets of data items [BD ADDR], [PageScanMode], [ClockOffset] and [Connect Backoff Time] are set in the payload (BNEP Payload), after the [NET SLAVES LIST] and [LIST NUM]. These data-item sets correspond to the slaves shown in the list, respectively. The data items of each set are arranged in the order they are mentioned. [BD ADDR] represents the Bluetooth-device addresses of the slaves. The next data items, [PageScanMode], are information that enables the backup master to operate in synchronism with the slaves. [Connect Backoff Time] makes the new master to transmit connection requests to the slaves at different times. This control packet may be transmitted in the form of an extension header that is added to the BNEP packet.

The new master may set the connection backoff time (Connect Backoff Time) by itself. In this case, the connection backoff time need not be contained, as notification data, in the BNEP packet.

The description will be further made, with reference to the process sequence shown in FIG. 19 again. In Step S51 in the sequence diagram of FIG. 19, the above-mentioned slave list is transmitted to the backup master (device B). When the master (device A) is thereafter removed from the piconet, it transmits a backup-master activation notice (BM Activation) to the device B that has been selected as a backup master, in Step S52. The backup-master activation notice (BM Activation) has the configuration described with reference to FIG. 13. If any new slave is added to the piconet, the list data is updated to contain the information about the new slave and is transmitted to the backup master (device B).

Next, in Step S53, a disconnection process (Disconnect) is carried out to disconnect the master (device A) from the slaves. This disconnection is either a spontaneous one or a forced one made by the master.

After the master is disconnected from the slaves, the device B, i.e., new master, performs the process of connecting itself to the slaves (devices C to G), one after another on the basis of the slave it has received. As new master, the device B can efficiently establish connection with each slave, by using the address, i.e., Bluetooth-device address (BD ADDR), and the synchronization information, which are contained in the slave list transmitted from the previous master (device A).

In the piconet thus set anew, the slaves start communication with the new master.

The present invention has been described in detail, with reference to a specific embodiment. Nonetheless, it is obvious that any person skilled in the art can modify or replace the embodiment without departing from the scope and spirit of this invention. That is, the embodiment describe above is nothing more than an example of the invention. To understand the gist of this invention, the claims set forth at the end of this specification should be considered.

The sequence of processes, described above, can be implemented by the use of hardware or software, or both. To perform the process sequence by using software, a program describing the sequence may be installed in a dedicated hardware element, or a memory, incorporated in a computer, or may be installed into a computer that can perform various processes.

The program may be recorded beforehand in, for example, a hard disc or a ROM (Read Only Memory) that is a recording medium. Alternatively, the program may be temporarily or permanently stored (recorded) in a removable recording medium such as a flexible disc, a CD-ROM (Compact Disc Read Only Memory), an MO (Magneto Optical) disc, a DVD (Digital Versatile Disc), a magnetic disc, a semiconductor memory or the like. The removable recording medium may be provided in the form of so-called "package software."

The program may be installed into the computer, read from such a removable recording medium as specified above. Otherwise, it may be transferred to the computer from a download site, either by wireless or via a network such as a LAN (Local Area Network) or the Internet. The computer receives the program thus transferred. The program can be installed in the recording medium, e.g., a hard disc, provided in the computer.

According to the present invention, various processes can be performed not only sequentially in the order described above, but also in parallel or independently, depending on the performances of the devices that carry out them or in accordance with necessity. The system implementing this invention is a logical assembly of various components. All components of the system are not necessarily arranged within the same housing.

The present invention is not limited to the embodiment that has been described with reference to the drawings. It would be obvious to anyone skilled in the art that various changes and modification can be made without departing the scope and spirit represented by the claims set forth at the end of this specification.

Industrial Applicability

As has been described, the present invention relates to a wireless communication network that comprises a master that performs a communication control process and one or more slave that can communicate via the master. Each slave transmits its various data-processing abilities, in the form of various performance parameters, to the master. The master selects one of the slaves as a candidate for the next master, on the basis of the performance parameters transmitted from the slaves. The master gives each slave the backup-master information that contains the address and synchronization information, both concerning the slave selected. From the backup-master information, each slave can determine which slave is the next master and can be immediately connected to the next master when the master is removed from the network. Hence, the user of the master need not select a slave as next master. In addition, the interruption of communication between the slaves can be shortened, and the slaves can be connected to the new master quickly and efficiently.

In accordance with this invention, performance parameters are the data-processing performance items evaluated of each slave, such as the remaining battery power, CPU performance, memory resource and RSSI (electric-field intensity). On the basis of these information items, the master can select a slave as backup master, which can cope with the operating condition of the network.

According to this invention, the backup-master information the master sends to the slaves contains the synchronization information about the backup master. Therefore, at least a part of the process of establishing synchronization necessary for the reconstruction of the network need not be carried out. This makes it possible to reconstruct the network efficiently within a short time.

In the present invention, backup-master information that is a list showing devices in the descending order of their master aptitudes may be transmitted to the slaves. Then, the slaves can have information about a plurality of backup masters. Namely, each slave can acquire the information of the other devices that constitute the piconet. Thus, if any slave cannot be connected to the backup master having the highest master aptitude when the master is removed from the piconet, because the backup master has been already removed from the piconet, it may be connected to the backup mater that has the second highest master aptitude.

According to this invention, a slave list may be transmitted the backup master. Then, in accordance with the slave list the device selected as new master can be connected to the slaves, one after another, after the master is disconnected from the slaves. Each slave need not perform any process to connect itself to the master. The device selected as new master can use the Bluetooth-device addresses (BD ADDRs) contained in the slave list and also the synchronization information, all transmitted from the previous master. The new master can therefore efficiently establish connection with the slaves. In the piconet thus set anew, the slaves can communicate with one another through the new master.

The invention claimed is:

1. A communication processing device configured to function as a master in a wireless communication network which comprises a plurality of slaves which communicate through the master and in which each of the plurality of slaves sends an inquiry to acquire address and synchronization information of the master upon setting up the wireless communication network and receives a signal containing the address and synchronization information of the master and each of the plurality of slaves performs a page process by transmitting a page signal containing attribute information, wherein the master and each of the plurality of slaves are synchronized in terms of frequency axis and time axis, the communication processing device comprising:

data-receiving means for receiving data from each of the plurality of slaves wherein each of the plurality of slaves is a device constituting the wireless communication network, wherein capabilities of data processing for items of evaluation are set as performance parameters in the data;

a processor which performs a process of determining a master aptitude for each of the plurality of slaves based on the performance parameters received from each of the plurality of slaves, a process of ranking each of the plurality of slaves from highest to lowest based on the determined master aptitude, and a process of determining one of the plurality of slaves, which has a master aptitude with the highest ranking, as a candidate slave set to be a backup-master for next master; and data-transmitting means for transmitting backup-master information to each of the plurality of slaves including address information and synchronization information of the backup-master, said synchronization information of the backup-master relating to comprising at least clock information, wherein the at least clock information allows another plurality of slaves to synchronize with the backup master, the address information of the backup-master is determined by the processor, wherein the another plurality of slaves are a set of slaves among the plurality of slaves without the candidate slave, wherein the another plurality of slaves can establish synchronization of a next network by using the backup-master information transmitted from the data-transmitting means, without each of the another plurality of slaves transmitting another inquiry signal to acquire the address of the backup-master and synchronization information of the backup-master, wherein the performance parameters include at least one of data items of remaining battery power, CPU (computer processing unit) performance, memory resource and RSSI (Radio Signal Strength Indicator), i.e., electric-field intensity, all pertaining to each of the plurality slaves, the processor determines the master aptitude by performing an operation in which a weight coefficient is applied to at least one of the performance parameters, and the master performs a process of transmitting a backup-master activation request packet to the backup master, the backup-master activation request packet requesting for activation of the backup-master.

2. The communication processing device according to claim 1, wherein the performance parameters include a data item; wherein the data item indicates whether the plurality of slaves can be set only as a network access point (NAP), only as a master of a group ad-hoc network (GN), or as either a NAP or a GN; and the processor only performs the process of determining the master aptitude for slaves among the plurality of slaves that has the data item with indication of GN.

3. The communication processing device according to claim 1, wherein the wireless communication network is a wireless communication network that performs Bluetooth communication; and the data-receiving means performs a process of receiving packets, each being a BNEP packet generated in accordance with Bluetooth network encapsulation protocol (BNEP) and containing the performance parameters.

4. The communication processing device according to claim 1, wherein the wireless communication network is a wireless communication network that performs Bluetooth communication; and the data-transmitting means performs a process of transmitting packets, including a BNEP packet generated in accordance with Bluetooth network encapsulation protocol (BNEP) and containing the backup-master information.

5. The communication processing device according to claim 1, wherein the performance parameters are stored in a BNEP packet generated in accordance with Bluetooth network encapsulation protocol (BNEP); and the processor performs a process of acquiring the performance parameters from the BNEP packets.

6. The communication processing device according to claim 1, wherein the processor performs a process of storing the backup-master information in a BNEP packet generated in accordance with Bluetooth network encapsulation protocol (BNEP), the backup-master information including address information of the backup-master and synchronization information.

7. The communication processing device according to claim 1, wherein
the processor further generates the backup-master activation request packet that requests for activation of the backup-master.

8. The communication processing device according to claim 7, wherein the processor performs a process of storing type information (Target UUID (Universal Unique Identifier)) in the backup-master activation request packet, the type information showing whether the backup-master should be set as a NAP (Network Access Point) or a GN (Group Ad-hoc Network).

9. The communication processing device according to claim 1, wherein
the processor figures out master aptitudes for each of the plurality of slaves, based on the performance parameters received from each of the plurality of slaves, and generates a packet containing a list that contains the address information items of each of the plurality of slaves and synchronization information of each of the plurality of slaves based on the master aptitudes, the list showing the address information items in the order of the master aptitudes of respective slaves; and
the data-transmitting means performs a process of transmitting the packet containing the list, to the plurality of slaves constituting the wireless communication network.

10. The communication processing device according to claim 1, wherein
the processor further generates a packet to be transmitted to the backup-master, the packet containing a list that contains address information of the plurality of slaves that are devices constituting the wireless communication network and synchronization information of the plurality of slaves; and
the data-transmitting means performs a process of transmitting the packet containing the list, to the backup-master.

11. A communication processing system in a wireless communication network that comprises a master which performs a communication control process and a plurality of slaves which communicate through the master, wherein each of the plurality of slaves sends an inquiry to acquire an address and synchronization information of the master upon setting up the wireless communication network, the communication processing system comprising:
the master, being a communication processing device, wherein the master sets a candidate slave to be a backup-master for next master based on data received from each of the plurality of slaves, wherein the received data containing performance parameters that are data-processing performance items evaluated of each of the plurality of slaves, and the master supplies backup-master information including address information and synchronization information of the backup-master to each of the plurality of slaves, said synchronization information of the backup-master comprising at least clock information, wherein the at least clock information allows each of another plurality of slaves to connect to the backup master; and
the plurality of slaves being communication processing devices which perform a process of determining data-processing performance items evaluated for the plurality of slaves in a form of performance parameters and transmitting the data-processing performance items to the master, and each of the plurality of slaves perform a process of receiving the backup-master information from the master and storing the backup-master information in memory means,
wherein the another plurality of slaves determine the backup-master on the basis of the backup-master information after becoming disconnected from the master, and each of the another plurality of slaves perform a connection process without transmitting another inquiry signal to acquire the address information and the synchronization information of the backup master, wherein the another plurality of slaves are set of slaves among the plurality of slaves without the candidate slave,
the performance parameters include at least one of data items of remaining battery power, CPU (computer processing unit) performance, memory resource and RSSI (Radio Signal Strength Indicator), i.e., electric-field intensity, all pertaining to each of the plurality of slaves,
a processor of the master determines a master aptitude of each of the plurality of slaves by performing an operation in which a weight coefficient is applied to at least one of the performance parameters, wherein the processor of the master performs a process of ranking each of the plurality of slaves from highest to lowest based on the determined master aptitude, and determines one of the plurality of slaves, which has a master aptitude with the highest ranking, as the candidate slave set to the backup-master for next master, and
the master performs a process of transmitting a backup-master activation request packet to the backup master, the backup-master activation request packet requesting for activation of the backup-master.

12. The communication processing system according to claim 11, wherein the master performs a process of storing the backup-master information in a BNEP packet generated in accordance with Bluetooth network encapsulation protocol (BNEP) and transmitting the BNEP packet to the slaves, the backup-master information including address information of the backup-master and synchronization information of the backup-master.

13. The communication processing system according to claim 11, wherein the master performs a process of transmitting a backup-master activation request packet to the backup master, the backup-master activation request packet requesting for activation of the backup-master.

14. The communication processing system according to claim 11, wherein the master generates a packet containing a list and transmitting the packet to the plurality of slaves, the list containing synchronization information of each of the plurality slaves and showing device-address information items of each of the plurality slaves in the order set in accordance with the master aptitudes of the plurality of slaves.

15. The communication processing system according to claim 11, wherein the master performs a process of generating a packet containing a list and transmitting the packet to the backup-master, the list containing synchronization information and address information items of the plurality of slaves that are devices constituting the wireless communication network.

16. A master-controlling method implemented on a communication processing device which is to act as a master in a wireless communication network which comprises a plurality of slaves which communicate through the master and in which each of the plurality of slaves sends an inquiry to acquire an address and synchronization information of the master upon setting up the wireless communication network and receives a signal containing the address of the master and synchronization information and performs a page process by transmitting a page signal containing attribute information of the respective slave, whereby the master and each of the plurality of slaves are synchronized in terms of frequency axis and time axis, the method comprising:

a data-receiving step, at the communication processing device, of receiving data from each of the plurality of slaves that are devices constituting the wireless communication network, wherein capabilities of data processing for items of evaluation are set as performance parameters in the data;

a data-processing step, at the communication processing device, of performing a process of determining a master aptitude for each of the plurality of slaves based on the performance parameters received from each of the plurality of slaves, a process of ranking each of the plurality of slaves from highest to lowest based on the determined master aptitude, and a process of determining one of the plurality of slaves, which has a master aptitude with the highest ranking, as a candidate slave set to be backup-master for next master; and a data-transmitting step, at the communication processing device, of transmitting backup-master information including address information and synchronization information of the backup-master, said synchronization information of the backup-master comprising at least clock information, wherein the at least clock information allows another plurality of slaves in the wireless communication network to connect to the backup master, the address information of the backup-master determined in the data-processing step, and wherein the another plurality of slaves can establish synchronization of a next network by using the backup-master information transmitted from the data-transmitting means, without each of the another plurality of slaves transmitting another inquiry signal to acquire the address of the backup-master and synchronization information of the backup-master, wherein the another plurality of slaves are set of slaves among the plurality of slaves without the candidate slave, the performance parameters include at least one of data items of remaining battery power, CPU (computer processing unit) performance, memory resource and RSSI (Radio Signal Strength Indicator), i.e., electric-field intensity, all pertaining to each of the plurality of slaves, the data processing step includes determining the master aptitude by performing an operation in which a weight coefficient is applied to at least one of the performance parameters, and the data-transmitting step further includes a process of transmitting a backup-master activation request packet to the backup master, the backup-master activation request packet requesting for activation of the backup-master.

17. The master-controlling method according to claim 16, wherein
the performance parameters include at least one of data items of remaining battery power, CPU performance, memory resource and RSSI, i.e., electric-field intensity, pertaining to a slave; and
the data-processing step determines the master aptitude based on at least one of the performance parameters.

18. A non-transitory computer-readable recording medium for storing therein a computer program for executing a method on a communication processing apparatus which is to function as a master in a wireless communication network that comprises a plurality of slaves which communicate through the master and each of the plurality of slaves sends an inquiry to acquire an address and synchronization information of the master upon setting up the wireless communication network and each of the plurality of slaves receives a signal containing the address and the synchronization information of the master and each of the plurality of slaves performs a page process by transmitting a page signal containing attribute information, wherein the master and each of the plurality of slaves are synchronized in terms of frequency axis and time axis, the method comprising:

a data-receiving step of receiving data from the plurality of slaves that are devices constituting the wireless communication network, wherein capabilities of data processing for items of evaluation are set as performance parameters in the data;

a data-processing step of performing a process of determining a master aptitude of each of the plurality of slaves based on the performance parameters received from the plurality of slaves, a process of ranking each of the plurality of slaves from highest to lowest based on the determined master aptitude, and a process of determining one of the plurality of slaves, which has a master aptitude with the highest ranking, as a candidate slave set to be a backup-master for next master; and a data-transmitting step of transmitting backup-master information including address information and synchronization information of the backup-master, said synchronization information of the backup-master comprising at least clock information, wherein the at least clock information allows another plurality of slaves in the wireless communication network to connect to the backup master, the address information of the backup-master is determined in the data-processing step, and wherein the another plurality of slaves are set of slaves among the plurality of slaves without the candidate slave, wherein each of the another plurality of slaves can establish synchronization of a next network by using the backup-master information transmitted in the data-transmitting step, without each of the another plurality of slaves transmitting another inquiry signal to acquire the address of the backup-master and synchronization information of the backup-master, the performance parameters include at least one of data items of remaining battery power, CPU (computer processing unit) performance, memory resource and RSSI (Radio Signal Strength Indicator), i.e., electric-field intensity, all pertaining to each of the plurality of slaves, the data-processing step includes determining the master aptitude by performing an operation in which a weight coefficient is applied to at least one of the performance parameters, and the data-transmitting step further includes a process of transmitting a backup-master activation request packet to the backup master, the backup-master activation request packet requesting for activation of the backup-master.

19. A communication processing device being a master in a wireless communication network in which the wireless communication network further comprises a plurality of slaves which communicate through the master and each of the plurality of slaves sends an inquiry to acquire an address and synchronization information of the master upon setting up the wireless communication network and receives a signal containing the address and synchronization information of the master and each of the plurality of slaves performs a page process by transmitting a page signal containing attribute information, wherein the master and each of the plurality of slaves are synchronized in terms of frequency axis and time axis, the communication processing device comprising:

- a data-receiving unit provided to receive data from each of the plurality of slaves that are devices constituting the wireless communication network, wherein capabilities of data processing for items of evaluation are set as performance parameters in the data;
- a hardware processor provided to perform a process of determining a master aptitude of each of the plurality of slaves based on the performance parameters received from each of the plurality of slaves, the hardware processor ranks each of the plurality of slaves from highest to lowest based on the determined master aptitude, and provides a process of determining one of the plurality of slaves as a candidate slave set to be a backup-master for next master based on the determined master aptitude with the highest ranking; and
- a data-transmitting unit provided to transmit backup-master information including address information and synchronization information of the backup-master, said synchronization information of the backup-master comprising at least clock information, wherein the at least clock information allows another plurality of slaves in the wireless communication network to connect to the backup master, the address information of the backup-master is determined by the processor, wherein the another plurality of slaves are a set of slaves among the plurality of slaves without the back-up master, wherein each of the another plurality of slaves can establish synchronization of a next network by using the backup-master information transmitted from the data-transmitting unit, without each of the another plurality of slaves transmitting another inquiry signal to acquire an address of the backup-master and synchronization information of the backup-master, the performance parameters include at least one of data items of remaining battery power, CPU (computer processing unit) performance, memory resource and RSSI (Radio Signal Strength Indicator), i.e., electric-field intensity, all pertaining to each of the plurality of slaves, the hardware processor determines the master aptitude by performing an operation in which a weight coefficient is applied to at least one of the performance parameters, and the master performs a process of transmitting a backup-master activation request packet to the backup master, the backup-master activation request packet requesting for activation of the backup-master.

* * * * *